(12) United States Patent
Zhou et al.

(10) Patent No.: US 11,964,680 B2
(45) Date of Patent: Apr. 23, 2024

(54) TRANSAXLE OF RAIL VEHICLE, RAIL VEHICLE, AND RAIL TRANSPORTATION SYSTEM

(71) Applicant: BYD COMPANY LIMITED, Guangdong (CN)

(72) Inventors: Kang Zhou, Shenzhen (CN); Guang Liu, Shenzhen (CN); Jingjing Wang, Shenzhen (CN); Jia Wei, Shenzhen (CN); Huiyue Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 932 days.

(21) Appl. No.: 16/967,666

(22) PCT Filed: Jan. 28, 2019

(86) PCT No.: PCT/CN2019/073416
§ 371 (c)(1),
(2) Date: Aug. 5, 2020

(87) PCT Pub. No.: WO2019/154157
PCT Pub. Date: Aug. 15, 2019

(65) Prior Publication Data
US 2021/0221412 A1 Jul. 22, 2021

(30) Foreign Application Priority Data

Feb. 6, 2018 (CN) .......................... 201810119258.1

(51) Int. Cl.
*B61F 15/20* (2006.01)
*B60B 35/00* (2006.01)
(Continued)

(52) U.S. Cl.
CPC ............ *B61F 15/20* (2013.01); *B60B 35/003* (2013.01); *B61F 3/04* (2013.01); *B61F 5/02* (2013.01);
(Continued)

(58) Field of Classification Search
CPC ...... B61F 3/04; B61F 5/02; B61F 5/22; B61F 5/26; B61F 5/38; B61F 5/52; B61F 15/20; B60B 35/003
See application file for complete search history.

(56) References Cited

U.S. PATENT DOCUMENTS 3,796,165 A 3/1974 Goode
4,287,830 A 9/1981 Braun et al.
(Continued)

FOREIGN PATENT DOCUMENTS

CN 203268050 U 11/2013
CN 206012602 U 3/2017
(Continued)

OTHER PUBLICATIONS

English Translation of International Search Report from PCT/CN2019/073416 dated Apr. 26, 2019 (2 pages).

*Primary Examiner* — Robert J McCarry, Jr.
(74) *Attorney, Agent, or Firm* — Calfee, Halter & Griswold LLP

(57) ABSTRACT

A transaxle of a rail vehicle includes: a power assembly; an axle body; a running wheel; a guiding frame; a horizontal wheel; and a connecting rod component, including a first transverse pull rod and a second transverse pull rod, where when the rail vehicle turns left, the horizontal wheel cooperates with a rail beam to drive the guiding frame to swing and drive the first transverse pull rod to move together, and the second transverse pull rod is driven by the first transverse pull rod to drive the running wheel to swing to the left, and when the rail vehicle turns right, the horizontal wheel cooperates with the rail beam to drive the guiding frame to swing and drive the first transverse pull rod to move together, and the second transverse pull rod is driven by the first transverse pull rod to drive the running wheel to swing to the right.

20 Claims, 20 Drawing Sheets

(51) Int. Cl.
*B61F 3/04* (2006.01)
*B61F 5/02* (2006.01)
*B61F 5/22* (2006.01)
*B61F 5/26* (2006.01)
*B61F 5/38* (2006.01)
*B61F 5/52* (2006.01)

(52) U.S. Cl.
CPC ............ *B61F 5/22* (2013.01); *B61F 5/26* (2013.01); *B61F 5/38* (2013.01); *B61F 5/52* (2013.01)

(56) References Cited

U.S. PATENT DOCUMENTS

| | | |
|---|---|---|
| 4,869,176 A | 9/1989 | von Scarpatetti |
| 2016/0164156 A1 | 6/2016 | Li et al. |

FOREIGN PATENT DOCUMENTS

| | | | | |
|---|---|---|---|---|
| CN | 106809221 A | * | 6/2017 | ............ B61F 5/52 |
| CN | 106809221 A | | 6/2017 | |
| CN | 106985875 A | | 7/2017 | |
| CN | 206734302 U | | 12/2017 | |
| DE | 3546493 A1 | | 8/1987 | |
| DE | 4240720 A1 | | 6/1994 | |
| EP | 1193154 A1 | | 4/2002 | |
| FR | 2675105 A1 | | 10/1992 | |
| JP | 2010195310 A | | 9/2010 | |

* cited by examiner

TRANSAXLE OF RAIL VEHICLE, RAIL VEHICLE, AND RAIL TRANSPORTATION SYSTEM

CROSS-REFERENCE TO RELATED APPLICATIONS

This application is the National Stage of International Application No. PCT/CN2019/073416, filed on Jan. 28, 2019, which claims priority to and benefits of Chinese Patent Application Serial No. 201810119258.1, filed on Feb. 6, 2018. The entire contents of the above-referenced applications are incorporated herein by reference.

FIELD

This application relates to the field of rail transportation technology, and specifically, to a transaxle of a rail vehicle, a rail vehicle, and a rail transportation system.

BACKGROUND

In a rail vehicle in the related art, running wheels and horizontal wheels run along a rail beam. When the vehicle needs to steer, the horizontal wheels drive an entire transaxle to steer under the action of the rail beam. The horizontal wheels tend to derail. It is not easy to implement the high-speed guidance and steering of the rail vehicle, affecting the performance of the rail vehicle. In addition, the transaxle does not include a power source. An engine or a motor is required to supply power, resulting in a complex structure and a low level of integration.

SUMMARY

This application is to at least resolve one of the technical problems in the prior art. For this, this application provides a transaxle of a rail vehicle. The transaxle of a rail vehicle has advantages such as self-guidance and high applicability.

This application further provides a rail vehicle having the transaxle of a rail vehicle.

This application further provides a rail transportation system having the rail vehicle.

To achieve the foregoing objective, an embodiment of a first aspect according to this application provides a transaxle of a rail vehicle. The transaxle of a rail vehicle includes: a power assembly; an axle body, the axle body being connected to a vehicle frame of a rail vehicle; a running wheel, the running wheel being rotatable in the axial direction of the running wheel and being transversely swingably mounted on the axle body, the running wheel being supported on a rail beam along which the rail vehicle travels, the power assembly being transmission-connected to the running wheel to drive the running wheel to rotate; a guiding frame, the guiding frame being mounted on the axle body rotatably relative to the axle body in the horizontal direction; a horizontal wheel, the horizontal wheel being disposed on the guiding frame; and a connecting rod component, the connecting rod component including a first transverse pull rod and a second transverse pull rod, the first transverse pull rod being pivotally mounted on the guiding frame, the second transverse pull rod being separately transmission-connected to the first transverse pull rod and the running wheel, where when the rail vehicle turns left, the horizontal wheel cooperates with the rail beam to drive the guiding frame to swing and drive the first transverse pull rod to move together, and the second transverse pull rod is driven by the first transverse pull rod to drive the running wheel to swing to the left, and when the rail vehicle turns right, the horizontal wheel cooperates with the rail beam to drive the guiding frame to swing and drive the first transverse pull rod to move together, and the second transverse pull rod is driven by the first transverse pull rod to drive the running wheel to swing to the right.

In addition, the transaxle of a rail vehicle in the foregoing embodiment according to this application may further have the following additional technical features:

In an embodiment according to this application, the horizontal wheel includes a front horizontal wheel and a rear horizontal wheel, and the front horizontal wheel and the rear horizontal wheel are disposed on the guiding frame at an interval in the longitudinal direction.

In an embodiment according to this application, two running wheels are provided and are separately mounted on two sides of the axle body.

In an embodiment according to this application, the connecting rod component further includes a left steering arm and a right steering arm, a first end of the first transverse pull rod is pivotally mounted on the guiding frame, the left steering arm and the right steering arm are separately located on two sides of the guiding frame, a first end of the left steering arm is transmission-connected to one of the running wheels that is located on the left side, a first end of the right steering arm is transmission-connected to one of the running wheels that is located on the right side, a second end of the first transverse pull rod is pivotally connected to the middle of one of the left steering arm and the right steering arm, a second end of the left steering arm and a second end of the right steering arm are separately pivotally connected to two ends of the second transverse pull rod, and the first transverse pull rod is transmission-connected to the second transverse pull rod by one of the left steering arm and the right steering arm.

In an embodiment according to this application, the guiding frame includes a frame body and a mounting base mounted on the frame body, and the first transverse pull rod is pivotally mounted on the mounting base.

In an embodiment according to this application, the mounting base is disposed at a right edge adjacent to the frame body, and the first transverse pull rod is pivotally connected to the left steering arm.

In an embodiment according to this application, the axle body includes: an axle housing assembly; and a left steering knuckle and a right steering knuckle, the left steering knuckle being pivotally connected to the axle housing assembly by a left pin shaft, the right steering knuckle being pivotally connected to the axle housing assembly by a right pin shaft, the two running wheels being separately rotatably mounted on the left steering knuckle and the right steering knuckle, the left steering arm being connected to the left steering knuckle, the right steering arm being connected to the right steering knuckle.

In an embodiment according to this application, the axle housing assembly is formed by welding a right half-axle fork, an axle housing, and a left half-axle fork, the left half-axle fork has an upper left limb and a lower left limb that are disposed at an interval in the vertical direction, the left pin shaft includes an upper left pin shaft and a lower left pin shaft, the left steering knuckle cooperates with the upper left pin shaft inside the upper left limb and cooperates with the lower left pin shaft inside the lower left limb to be pivotally connected to the left half-axle fork, the right half-axle fork has an upper right limb and a lower right limb that are disposed at an interval in the vertical direction, the right pin shaft includes an upper right pin shaft and a lower right pin shaft, and the right steering knuckle cooperates with the upper right pin shaft inside the upper right limb and cooperates with the lower right pin shaft inside the lower right limb to be pivotally connected to the right half-axle fork.

In an embodiment according to this application, a push cylindrical roller bearing is disposed between the left steering knuckle and at least one of the upper left limb and the lower left limb, and a push cylindrical roller bearing is disposed between the right steering knuckle and at least one of the upper right limb and the lower right limb.

In an embodiment according to this application, the transaxle of a rail vehicle further includes two brakes, the two running wheels are respectively mounted on the left steering knuckle and the right steering knuckle by a wheel hub assembly, and the two brakes are respectively locked on the two wheel hub assemblies by a guiding bolt.

In an embodiment according to this application, the transaxle of a rail vehicle further includes a dust guard that is sleeved over the guiding bolt and used for preventing dust from touching the surface of the guiding bolt.

In an embodiment according to this application, a wheel speed sensor is disposed on at least one of the left steering knuckle and the right steering knuckle, an induction ring gear that rotates along with the running wheel is disposed on the brake, and the wheel speed sensor detects the rotation of the induction ring gear to detect the rotational speed of the running wheel.

In an embodiment according to this application, the transaxle of a rail vehicle further includes a rear cover assembly, the rear cover assembly is mounted on the axle body, an oil addition plug used for adding gear lubricating oil to the axle housing is disposed on the rear cover assembly, and an oil discharge plug used for discharging the gear lubricating oil is disposed on the bottom wall of the axle body.

In an embodiment according to this application, the transaxle of a rail vehicle further includes a transmission shaft assembly, a first end of the transmission shaft assembly is transmission-connected to the power assembly by a spline, a second end of the transmission shaft assembly is transmission-connected to the running wheel, and the transmission shaft assembly is supported on the axle housing assembly and a steering knuckle assembly by a needle roller bearing.

In an embodiment according to this application, the power assembly includes a motor and a main reduction drive, the motor is electrically connected to a battery of the rail vehicle, and an output shaft of the motor is transmission-connected to the transmission shaft assembly by the main reduction drive.

In an embodiment according to this application, two front horizontal wheels are provided, two rear horizontal wheels are provided, the upper surface of the rail beam is provided with a groove, the two front horizontal wheels respectively abut two sidewalls of the groove, and the two rear horizontal wheels respectively abut two sidewalls of the groove.

In an embodiment according to this application, the guiding frame is generally rectangular, and the two front horizontal wheels and the two rear horizontal wheels are respectively mounted at four corners of the guiding frame.

In an embodiment according to this application, the transaxle of a rail vehicle further includes a shock absorber assembly, and the shock absorber assembly is separately connected to the axle body and the vehicle frame of the rail vehicle.

In an embodiment according to this application, the transaxle of a rail vehicle further includes: a secondary spring assembly, the structure of the secondary spring assembly including a spring upper base plate, the spring upper base plate being mounted on the vehicle frame of the rail vehicle, the lower surface of the spring upper base plate being provided with an upper guiding post; and a spring lower base plate, the spring lower base plate being connected to the axle body, the upper surface of the spring lower base plate being provided with a lower guiding post; an auxiliary spring, the auxiliary spring being sleeved over the upper guiding post and the lower guiding post; and a main spring, the main spring being sleeved over the auxiliary spring.

In an embodiment according to this application, the transaxle of a rail vehicle further includes a V-shaped push rod component, the V-shaped push rod component including: a V push mounting base, the V push mounting base being mounted on the axle body; two V push rod cylinders, first ends of the two V push rod cylinders being connected to the V push mounting base, second ends of the two V push rod cylinders being far away from each other; two V push rod heads, the two V push rod heads being separately in threaded cooperation inside the two V push rod cylinders; and two V push rod head mounting bases, the two V push rod heads being respectively connected to the vehicle frame of the rail vehicle by the two V push rod head mounting bases.

In an embodiment according to this application, the transaxle of a rail vehicle further includes two straight push rod components, each straight push rod component including: two straight push rod heads, one of the two straight push rod heads being mounted on the axle body; a straight push rod head mounting base, the other of the two straight push rod heads being mounted on the vehicle frame of the rail vehicle by the straight push rod head mounting base; a straight push rod cylinder, the two straight push rod heads being separately in cooperation inside two ends of the straight push rod cylinder; and two locking bushings used for locking connections between the straight push rod cylinder and the straight push rod heads, the two locking bushings being sleeved over the straight push rod cylinder and being separately disposed at two ends of the straight push rod cylinder.

In an embodiment according to this application, the transaxle of a rail vehicle further includes a stabilizing rod assembly, the stabilizing rod assembly including: two stabilizing rod sleeves; two stabilizing rod heads, the stabilizing rod head being mounted on the axle body; two stabilizing rod connecting rods, two ends of each stabilizing rod connecting rod being respectively in threaded cooperation inside the stabilizing rod head and the stabilizing rod sleeve; two swing rods, a first end of each swing rod being pivotally connected to the stabilizing rod sleeve, a second end of the swing rod being provided with a through hole; a stabilizing rod body, two ends of the stabilizing rod body separately passing through the two through holes; and two stabilizing rod mounting support bases, two ends of the stabilizing rod body being respectively mounted on the vehicle frame of the rail vehicle by the two stabilizing rod mounting support bases.

In an embodiment according to this application, the transaxle of a rail vehicle further includes a support post assembly, the support post assembly including: two auxiliary support posts, a first end of each auxiliary support post being mounted on the axle body; a main support post, a first end of the main support post being mounted on the axle body, a second end of the main support post being axially rotatably mounted on the guiding frame; and two guiding frame support wheels, the guiding frame being provided with a chute, a second end of each auxiliary support post passing through the chute to be connected to the guiding frame support wheel, the guiding frame being supported on the guiding frame support wheel.

An embodiment of a second aspect according to this application provides a rail vehicle, the rail vehicle including the transaxle of a rail vehicle in the embodiment of the first aspect according to this application.

For the rail vehicle in the embodiment according to this application, the transaxle of a rail vehicle in the embodiment of the first aspect according to this application is used, and the transaxle has advantages such as self-guidance and high applicability.

An embodiment of a third aspect according to this application provides a rail transportation system, the rail transportation system including the rail vehicle in the embodiment of the second aspect according to this application.

For the rail vehicle in the embodiment according to this application, the transaxle of a rail vehicle in the embodiment of the first aspect according to this application is used, and the transaxle has advantages such as self-guidance and high applicability.

Additional aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description made with reference to the following accompanying drawings, wherein.

Figure 1:
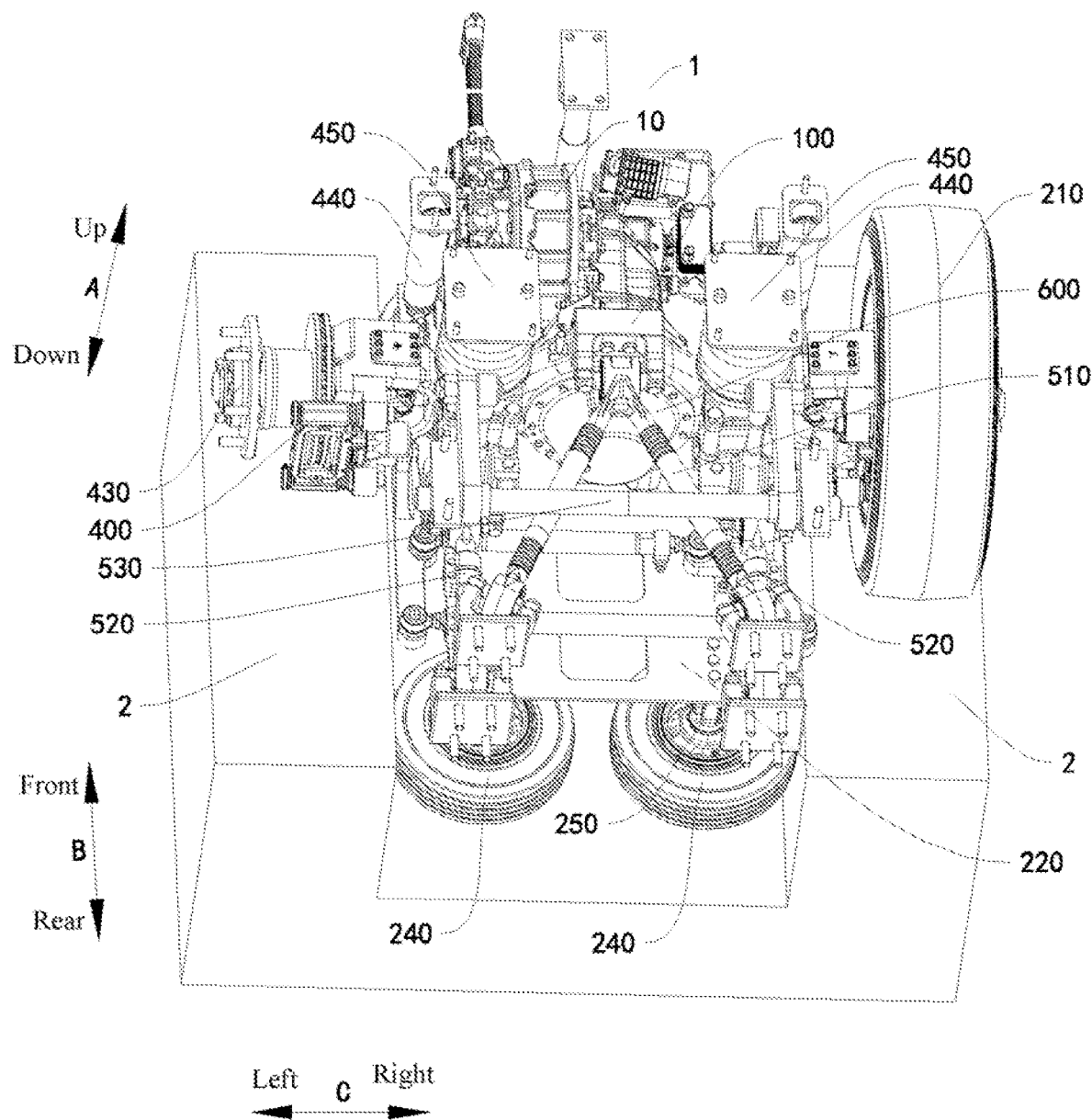
FIG. 1 is a schematic structural diagram of a transaxle of a rail vehicle according to an embodiment of this application.
Figure 2:
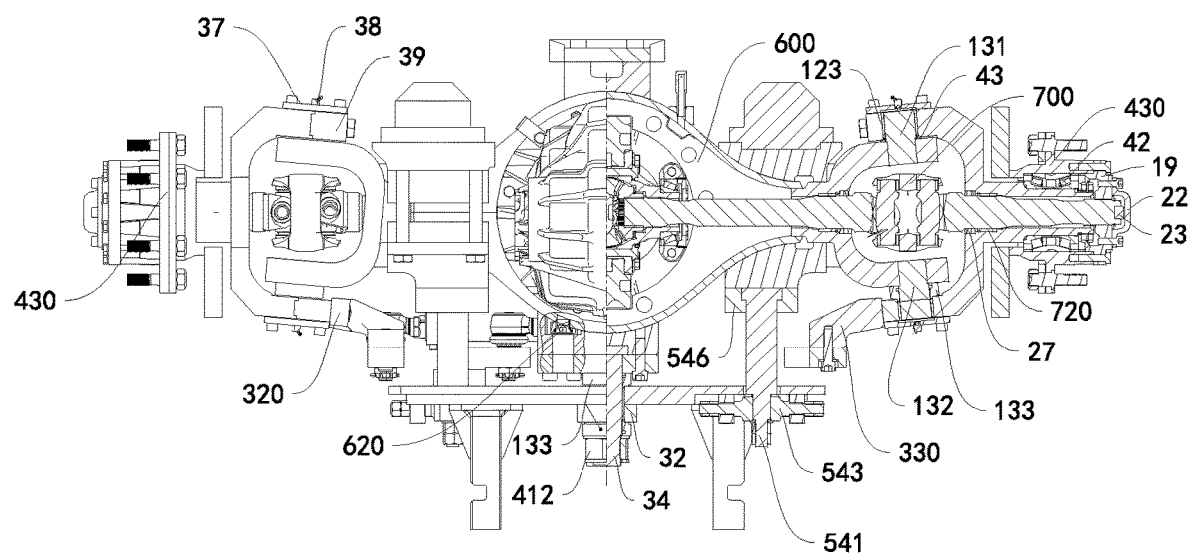
FIG. 2 is a partial sectional view of a transaxle of a rail vehicle according to an embodiment of this application.
Figure 3:
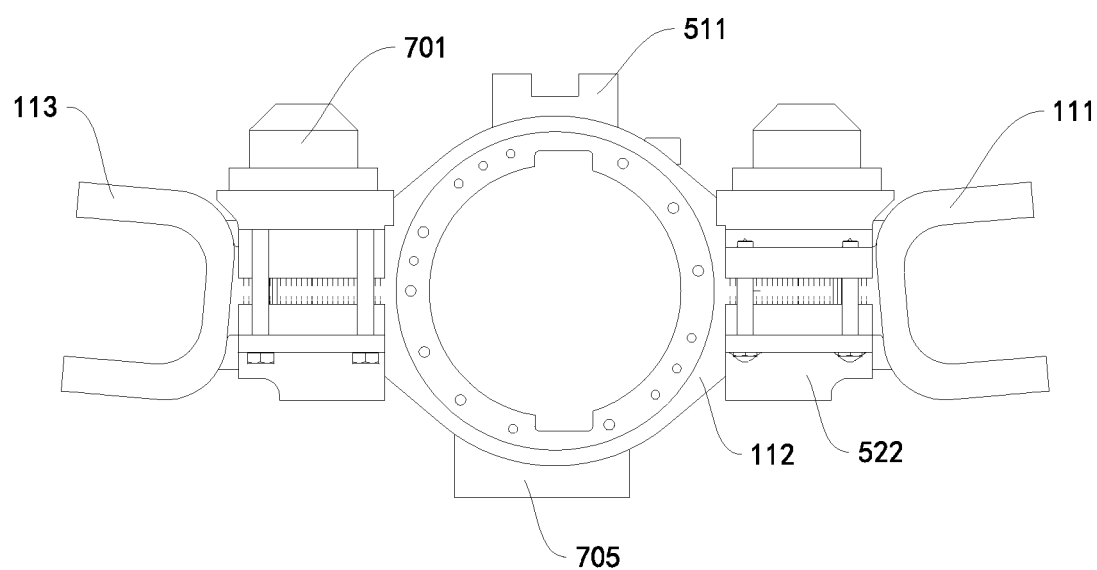
FIG. 3 is a schematic structural diagram of an axle housing assembly of a transaxle of a rail vehicle according to an embodiment of this application.
Figure 4:
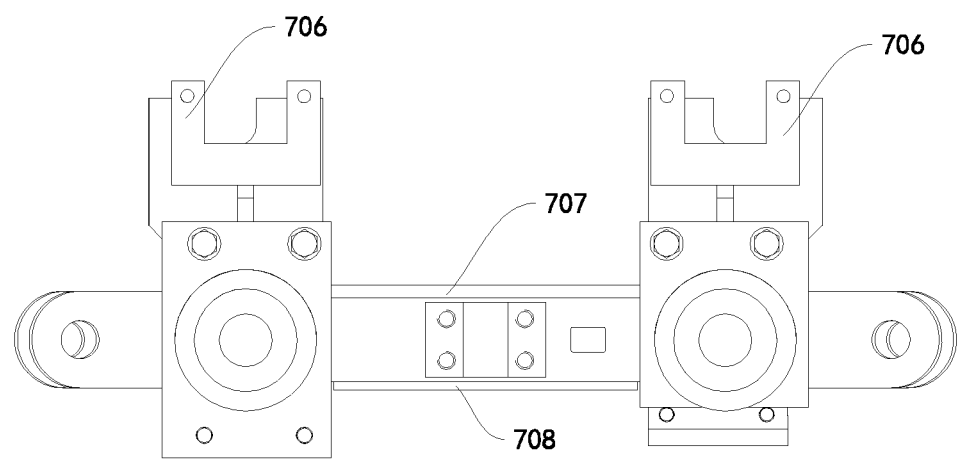
FIG. 4 is a schematic structural diagram of an axle housing assembly of a transaxle of a rail vehicle according to an embodiment of this application.

Reference numerals: transaxle 1, power assembly 10, axle body 100, axle housing assembly 110, right half-axle fork 111, upper right limb 116, lower right limb 117, axle housing 112, left half-axle fork 113, upper left limb 114, lower left limb 115, V-shaped push-rod mounting base plate 118, upper leaf-spring base 1191, lower leaf-spring base 1192, gasket 1193, fixing block 121, main pin end-face cover 122, copper sleeve 123, upper right pin shaft 131, lower right pin shaft 132, left steering knuckle 120, right steering knuckle 130, push cylindrical roller bearing 133, wheel speed sensor 140, running wheel 210, guiding frame 220, frame body 221, mounting base 222, front horizontal wheel 230, rear horizontal wheel 240, horizontal wheel mounting component 250, connecting rod component 300, first transverse pull rod 310, left steering arm 320, right steering arm 330, second transverse pull rod 340, brake 400, guiding bolt 410, nut cover 411, locking nut 412, dust guard 420, wheel hub assembly 430, shock absorber assembly 440, secondary spring assembly 450, spring upper base plate 451, upper guiding post 455, spring lower base plate 452, lower guiding post 456, auxiliary spring 453, main spring 454, spring gasket 457, spring spacer 458, induction ring gear 460, V-shaped push rod component 510, V push mounting base 511, V push rod cylinder 512, V push rod head 513, V push rod head mounting base 514, straight push rod component 520, straight push rod head 521, straight push rod head mounting base 522, straight push rod cylinder 523, locking bushing 524, stabilizing rod assembly 530, stabilizing rod sleeve 531, stabilizing rod head 532, stabilizing rod connecting rod 533, swing rod 534, stabilizing rod body 535, stabilizing rod mounting support base 536, swing rod shaft sleeve 537, support base shaft sleeve 538, support post assembly 540, auxiliary support post 541, main support post 542, guiding frame support wheel 543, support post mounting base plate 544, support tube 545, auxiliary support post mounting base 546, guiding frame support wheel bracket 547, main support post mounting base 69, bearing spacer 71, support post copper sleeve 73, support post packing block 74, lock spacer 76, rear cover assembly 600, oil addition plug 610, oil discharge plug 620, transmission shaft assembly 700, spline 710, needle roller bearing 720, grease nipple 38, main pin fixing block 39, main pin cap 37, gap adjustment spacer 43, rolling bearing 42, wheel hub end cover 19, limit end cover 22, limit block 23, rubber oil seal 27, guiding frame clamping block 32, guiding frame support post 34, shock absorption spring mounting base 701, straight pushrod mounting base 704, shock absorber mounting base 706, rear base plate 707, front base plate 708, guiding frame support post mounting base 705, wheel-hub near-end spline shaft 801, wheel-hub far-end spline shaft 802, universal joint 803, brake disc 203, brake mounting base 102, spacer 103, and rail beam 2.

DETAILED DESCRIPTION

The following describes embodiments of this application in detail. Examples of the embodiments are shown in the accompanying drawings, and same or similar reference signs in all the accompanying drawings indicate same or similar components or components having same or similar functions. The embodiments that are described with reference to the accompany drawings are exemplary, and are only used to interpret this application, instead limiting this application.

A transaxle 1 of a rail vehicle according to an embodiment of this application is described below with reference to the accompanying drawings.

As shown in FIG. 1 to FIG. 20, the transaxle 1 of a rail vehicle according to this embodiment of this application includes a power assembly 10, an axle body 100, a running wheel 210, a guiding frame 220, a horizontal wheel, and a connecting rod component 300.

The axle body 100 is connected to a vehicle frame of a rail vehicle. The running wheel 210 is rotatable in the axial direction of the running wheel 210 and is transversely swingably mounted on the axle body 100 (the transverse direction is shown by an arrow C in FIG. 1). The running wheel 210 is supported on a rail beam 2 along which the rail vehicle travels. The power assembly 10 is transmission-connected to the running wheel 210 to drive the running wheel 210 to rotate. The guiding frame 220 is mounted on the axle body 100 rotatably relative to the axle body 100 in the horizontal direction. The horizontal wheel is disposed on the guiding frame 220. The connecting rod component 300 includes a first transverse pull rod 310 and a second transverse pull rod 340. The first transverse pull rod 310 is pivotally mounted on the guiding frame 220. The second transverse pull rod 340 is separately transmission-connected to the first transverse pull rod 310 and the running wheel 210. When the rail vehicle turns left, the horizontal wheel cooperates with the rail beam 2 to drive the guiding frame 220 to swing and drive the first transverse pull rod 310 to move together, and the second transverse pull rod 340 is driven by the first transverse pull rod 310 to drive the running wheel 210 to swing to the left. When the rail vehicle turns right, the horizontal wheel cooperates with the rail beam 2 to drive the guiding frame 220 to swing and drive the first transverse pull rod 310 to move together, and the second transverse pull rod 340 is driven by the first transverse pull rod 310 to drive the running wheel 210 to swing to the right.

A person skilled in the art may understand that "the running wheel 210 swings to the left" means that the running wheel 210 swings to the left from the front end of the rail vehicle relative to the rear end, and "the running wheel 210 swings to the right" means that the running wheel 210 swings to the right from the front end of the rail vehicle relative to the rear end.

It needs to be understood herein that "the second transverse pull rod is separately transmission-connected to the first transverse pull rod and the running wheel" may be understood in the broadest sense, including that the second transverse pull rod is directly connected to the first transverse pull rod and the running wheel or including that the second transverse pull rod is indirectly connected to the first transverse pull rod and the running wheel by another transmission structure.

The working process of the transaxle 1 according to this embodiment of this application is described below with reference to the accompanying drawings.

When the rail vehicle travels, the horizontal wheel runs along the inner side of the rail beam 2. When the transaxle 1 needs to steer, under the action of the rail beam 2, the horizontal wheel drives the guiding frame 220 to rotate and drives the first transverse pull rod 310. The second transverse pull rod 340 is driven by the first transverse pull rod 310 to drive the running wheel 210 to swing, to enable the running wheel 210 to adapt to the steering direction of the rail beam 2, to implement the self-steering function of the transaxle 1, thereby facilitating the steering of the rail vehicle.

For the transaxle 1 of a rail vehicle according to this embodiment of this application, the guiding frame 220 and the connecting rod component 300 are disposed, and the connecting rod component 300 is separately transmission-connected to the guiding frame 220 and the running wheel 210, so that when the rail vehicle steers, the horizontal wheel may be sequentially subject to the guidance of the rail beam 2 in a bent form, to use the cooperation between the horizontal wheel and the rail beam 2 to drive the guiding frame 220 to rotate relative to the rail vehicle, further use the guiding frame 220 to drive the connecting rod component 300 to rotate, and eventually use the connecting rod component 300 to drive the running wheel 210 to swing. Compared with the rail vehicle in the related art, the self-guidance function of the transaxle 1 can be implemented. For example, each car of the rail vehicle can run separately. In this way, the number of coupled cars can be increased or reduced at will, thereby improving the flexibility and variability of the rail vehicle, improving the adaptability of the rail vehicle, improving the range of application of the rail vehicle, and facilitating the use of the rail vehicle.

In addition, the guiding frame 220 and the connecting rod component 300 are disposed, so that the resistance during the steering of the transaxle 1 can be reduced, thereby reducing the steering radius of the rail vehicle. It can be ensured that the rail vehicle travels smoothly on the rail beam 2, and the high-speed guidance and steering of the rail vehicle can be implemented, thereby increasing the travel speed of the rail vehicle and improving the work performance of the rail vehicle.

In addition, the guiding frame 220 and the connecting rod component 300 are disposed, and the guiding frame 220 and the connecting rod component 300 can distribute the steering force to different parts of the transaxle 1. Compared with the rail vehicle in the related art, a single part can be prevented from fracturing under an excessively large force, thereby improving the reliability and stability of the travel of the rail vehicle, so that the travel safety of the rail vehicle can be ensured.

Moreover, the power assembly 10 is disposed. In this way, the transaxle 1 can have the steering function, the electrical drive function, and the guidance function, thereby improving the comprehensive performance of the rail vehicle. For example, it can be ensured that each car of the rail vehicle can run separately, making it convenient to change the number of cars of the rail vehicle, thereby satisfying different requirements of the number of cars of the rail vehicle, further improving the adaptability of the rail vehicle, improving the level of integration of the rail vehicle, and facilitating the manufacturing and assembly of the rail vehicle. In addition, the work efficiency of the transaxle 1 can be improved to reduce the working noise of the transaxle 1, making the rail vehicle energy saving and environmentally friendly.

Further, the transaxle in the related art does not include a power source, and an additional mechanism is required to implement a transmission connection to an engine or a motor, resulting in a complex structure of the rail vehicle. In the rail vehicle of this application, the power assembly 10 disposed on the transaxle 1 is directly used to drive the running wheel 210, to simplify the structure of the entire vehicle, making the structure of the rail vehicle more compact and appropriate.

Therefore, the transaxle 1 of a rail vehicle according to this embodiment of this application has advantages such as self-guidance and high applicability.

The transaxle 1 of a rail vehicle according to a specific embodiment of this application is described below with reference to the accompanying drawings.

In some specific embodiments of this application, as shown in FIG. 1 to FIG. 20, the transaxle 1 of a rail vehicle according to this embodiment of this application includes a power assembly 10, an axle body 100, a running wheel 210, a guiding frame 220, a horizontal wheel, and a connecting rod component 300.

Specifically, the power assembly 10 may be an electrical assembly.

Optionally, the horizontal wheel includes a front horizontal wheel 230 and a rear horizontal wheel 240. The front horizontal wheel 230 and the rear horizontal wheel 240 are disposed on the guiding frame 220 at an interval in the longitudinal direction (the longitudinal direction is shown by an arrow B in FIG. 1). In this way, it is convenient to use the front horizontal wheel 230 and the rear horizontal wheel 240 to guide the vehicle, making the vehicle steer smoothly.

Specifically, two running wheels 210 are provided and are separately mounted on two sides of the axle body 100. In this way, the running wheel 210 may be subject to a more uniform force, thereby improving the structural stability of the rail vehicle.

Figure 20:
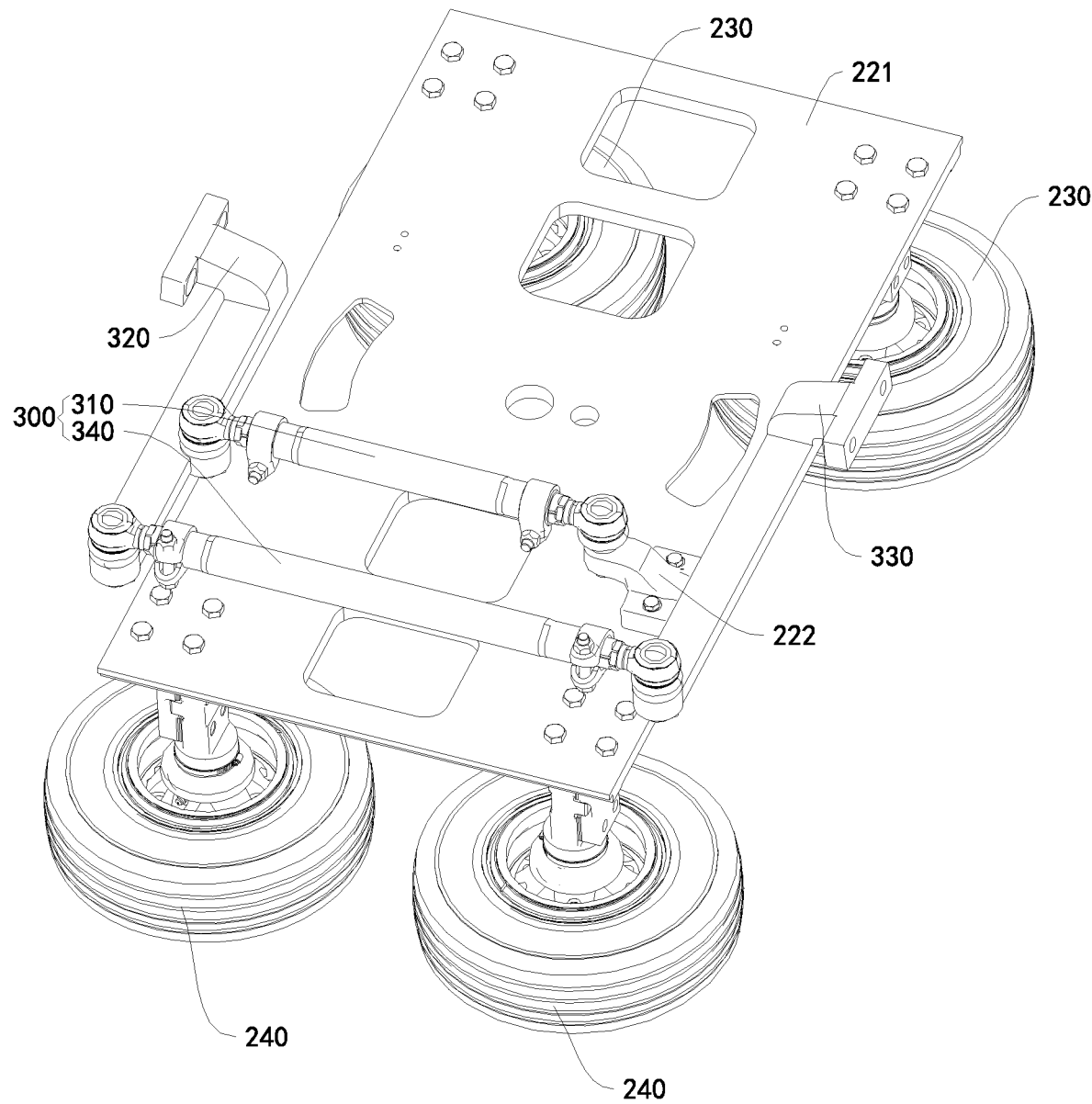
FIG. 20 is a partial schematic structural diagram of a transaxle of a rail vehicle according to an embodiment of this application.

More specifically, as shown in FIG. 1 and FIG. 20, the connecting rod component 300 further includes a left steering arm 320 and a right steering arm 330. A first end of the first transverse pull rod 310 is pivotally mounted on the guiding frame 220. The left steering arm 320 and the right steering arm 330 are separately located on two sides of the guiding frame 220. A first end of the left steering arm 320 is transmission-connected to one of the running wheels 210 that is located on the left side. A first end of the right steering arm 330 is transmission-connected to one of the running wheels 210 that is located on the right side. A second end of the first transverse pull rod 310 is pivotally connected to the middle of one of the left steering arm 320 and the right steering arm 330. A second end of the left steering arm 320 and a second end of the right steering arm 330 are respectively pivotally connected to two ends of the second transverse pull rod 340. The first transverse pull rod 310 is transmission-connected to the second transverse pull rod 340 one of the left steering arm 320 and the right steering arm 330. Specifically, "the middle of one of the left steering arm 320 and the right steering arm 330" means a position between two ends of one of the left steering arm 320 and the right steering arm 330. In this way, it is convenient to implement that the connecting rod component 300 is separately transmission-connected to the guiding frame 220 and the running wheel 210.

Specifically, as shown in FIG. 1 and FIG. 20, the first transverse pull rod 310 is transmission-connected to the second transverse pull rod 340 by the left steering arm 320. The left steering arm 320 and the right steering arm 330 are separately located on two sides of the guiding frame 220. The first end of the first transverse pull rod 310 is pivotally mounted on the guiding frame 220. The second end of the first transverse pull rod 310 is pivotally connected to the middle of the left steering arm 320. The first end of the left steering arm 320 is transmission-connected to the running wheel 210 on the left side. The first end of the right steering arm 330 is transmission-connected to the running wheel 210 on the right side. The second end of the left steering arm 320 and the second end of the right steering arm 330 are respectively pivotally connected to two ends of the second transverse pull rod 340. In the longitudinal direction, the first transverse pull rod 310 is located behind the second transverse pull rod 340. The running wheel 210 is connected to rear ends of the left steering arm 320 and the right steering arm 330. The second transverse pull rod 340 is connected to front ends of the left steering arm 320 and the right steering arm 330.

Further, as shown in FIG. 1 and FIG. 20, the guiding frame 220 includes a frame body 221 and a mounting base 222 mounted on the frame body 221. The first transverse pull rod 310 is pivotally mounted on the mounting base 222. In this way, it is convenient to use the guiding frame 220 and the first transverse pull rod 310 in cooperation, making it convenient for the guiding frame 220 to drive the first transverse pull rod 310 to rotate.

Furthermore, as shown in FIG. 20, the mounting base 222 is disposed at a right edge adjacent to the frame body 221. The first transverse pull rod 310 is pivotally connected to the left steering arm 330. In this way, the first transverse pull rod 310 is conveniently disposed, further making it convenient for the guiding frame 220 to drive the first transverse pull rod 310 to rotate.

Specifically, as shown in FIG. 1, FIG. 2, FIG. 9, and FIG. 10, the axle body 100 includes an axle housing assembly 110, a left steering knuckle 120, and a right steering knuckle 130. The left steering knuckle 120 is pivotally connected to the axle housing assembly 110 by a left pin shaft. The right steering knuckle 130 is pivotally connected to the axle housing assembly 110 by a right pin shaft. The two running wheels 210 are respectively rotatably mounted on the left steering knuckle 120 and the right steering knuckle 130. The left steering arm 320 is connected to the left steering knuckle 120. The right steering arm 330 is connected to the right steering knuckle 130. In this way, it is convenient for the running wheel 210 to implement steering smoothly.

More specifically, the axle housing assembly 110 is formed by welding a right half-axle fork 111, an axle housing 112, and a left half-axle fork 113. The left half-axle fork 113 has an upper left limb 114 and a lower left limb 115 that are disposed at an interval in the vertical direction (the vertical direction is shown by an arrow A in FIG. 1). The left pin shaft includes an upper left pin shaft and a lower left pin shaft. The left steering knuckle 120 cooperates with the upper left pin shaft inside the upper left limb 114 shaft and cooperates with the lower left pin shaft inside the lower left limb 115 to be pivotally connected to the left half-axle fork 113. The right half-axle fork 111 has an upper right limb 116 and a lower right limb 117 that are disposed at an interval in the vertical direction. The right pin shaft includes an upper right pin shaft 131 and a lower right pin shaft 132. The right steering knuckle 130 cooperates with the upper right pin shaft 131 inside the upper right limb 116 and cooperates with the lower right pin shaft 132 inside the lower right limb 117 to be pivotally connected to the right half-axle fork 111. In this way, it is convenient for the left steering knuckle 120 and the right steering knuckle 130 to be separately connected in cooperation to the axle housing assembly 110.

Figure 9:
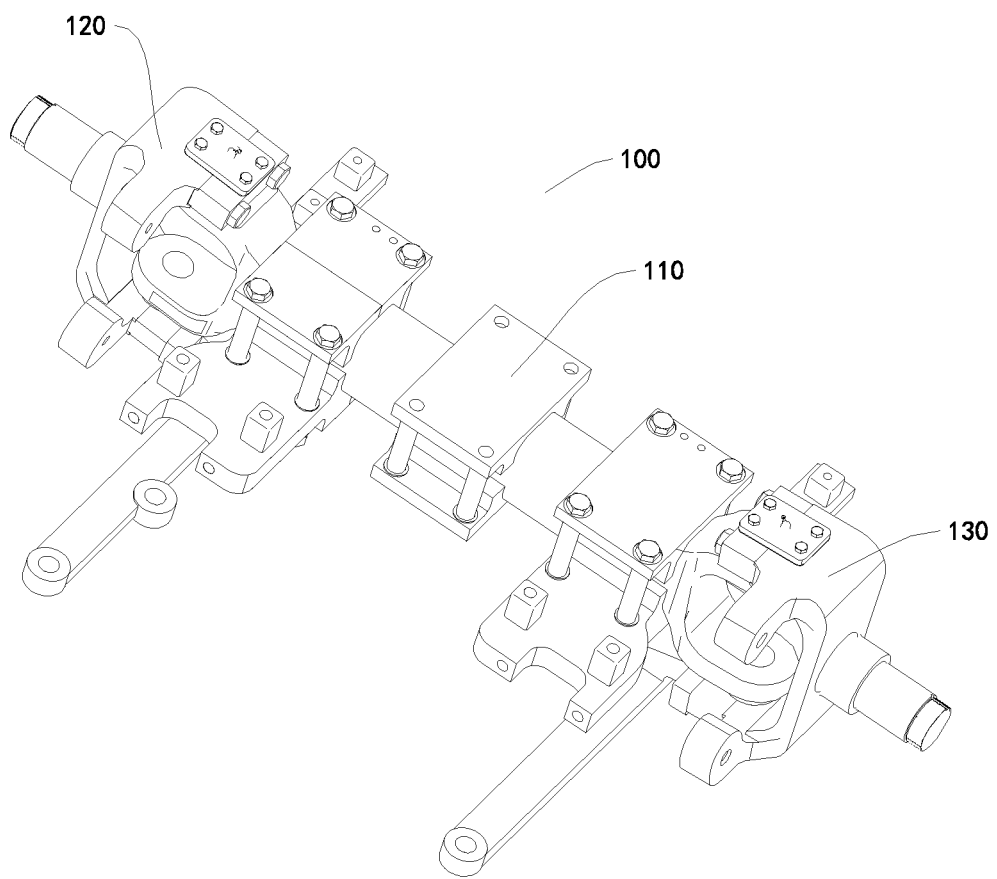
FIG. 9 is a schematic structural diagram of an axle body of a transaxle of a rail vehicle according to an embodiment of this application.
Figure 10:
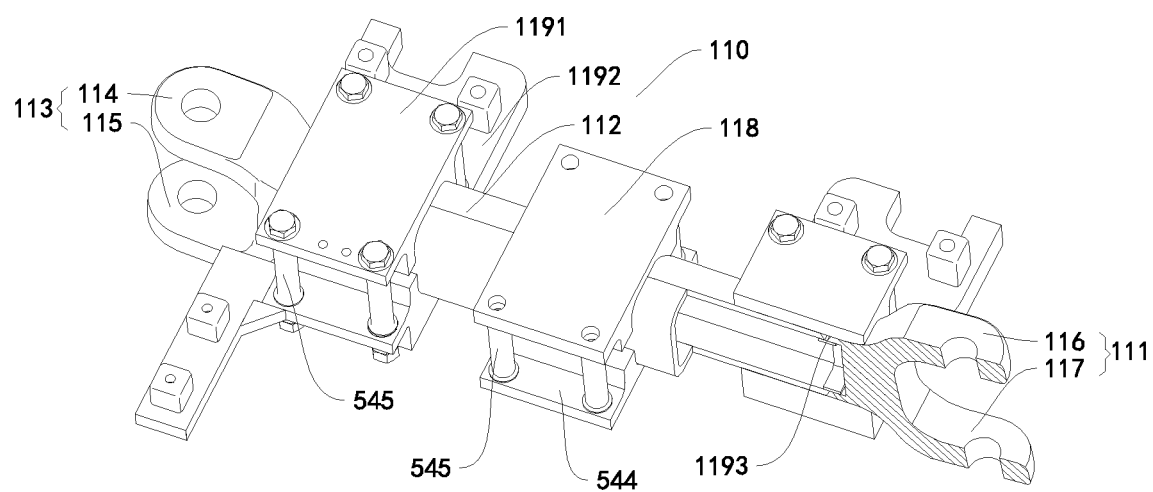
FIG. 10 is a partial sectional view of an axle housing assembly of a transaxle of a rail vehicle according to an embodiment of this application.
Figure 11:
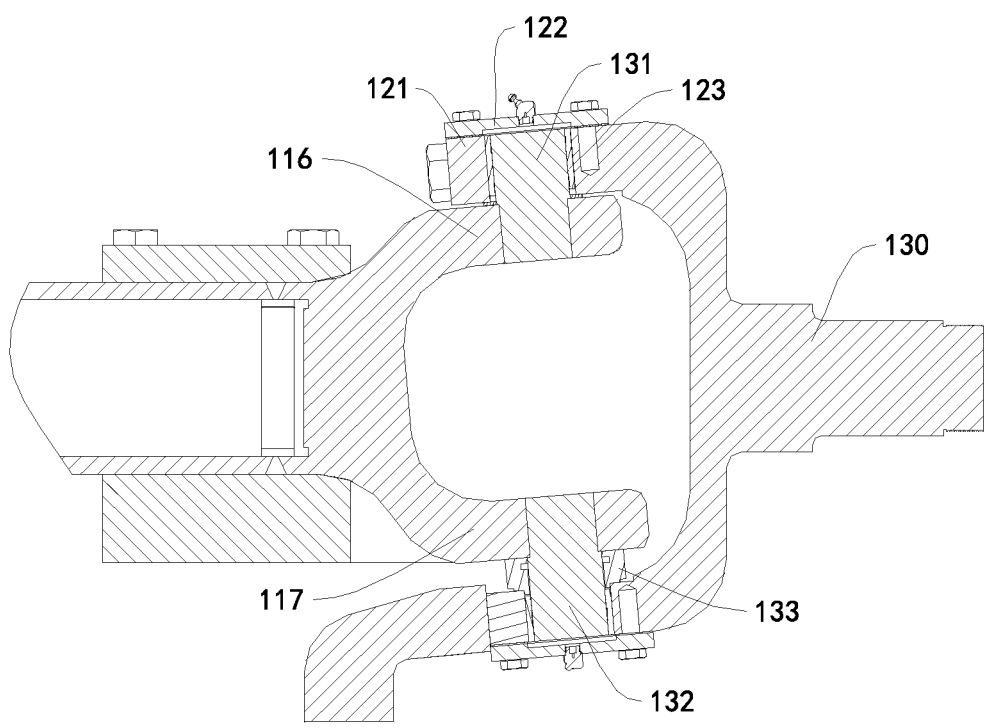
FIG. 11 is a partial sectional view of an axle body of a transaxle of a rail vehicle according to an embodiment of this application.

Further, as shown in FIG. 9 to FIG. 11, a push cylindrical roller bearing 133 is disposed between the left steering knuckle 120 and at least one of the upper left limb 114 and the lower left limb 115. A push cylindrical roller bearing 133 is disposed between the right steering knuckle 130 and at least one of the upper right limb and the lower right limb. Specifically, the push cylindrical roller bearing 133 is disposed between the lower left limb 115 and the lower right limb. In this way, the movement of the left steering knuckle 120 and the right steering knuckle 130 is facilitated, thereby improving the movement reliability of the left steering knuckle 120 and the right steering knuckle 130.

Specifically, as shown in FIG. 9 and FIG. 11, the left steering knuckle 120 and the right steering knuckle 130 further include a fixing block 121, a main pin end-face cover 122, and a copper sleeve 123. The left steering knuckle 120 and the right steering knuckle 130 are separately connected by bolts. In this way, the left steering knuckle 120 and the right steering knuckle 130 are conveniently disposed.

Optionally, as shown in FIG. 1, FIG. 6, FIG. 7, and FIG. 9, the transaxle 1 further includes two brakes 400. The two running wheels 210 are respectively mounted on the left steering knuckle 120 and the right steering knuckle 130 by a wheel hub assembly 430. The two brakes 400 are respectively locked on the two wheel hub assemblies 430 by a guiding bolt 410. In this way, it is convenient for the rail vehicle to implement the functions such as deceleration, stop or keeping a stopped state.

Figure 12:
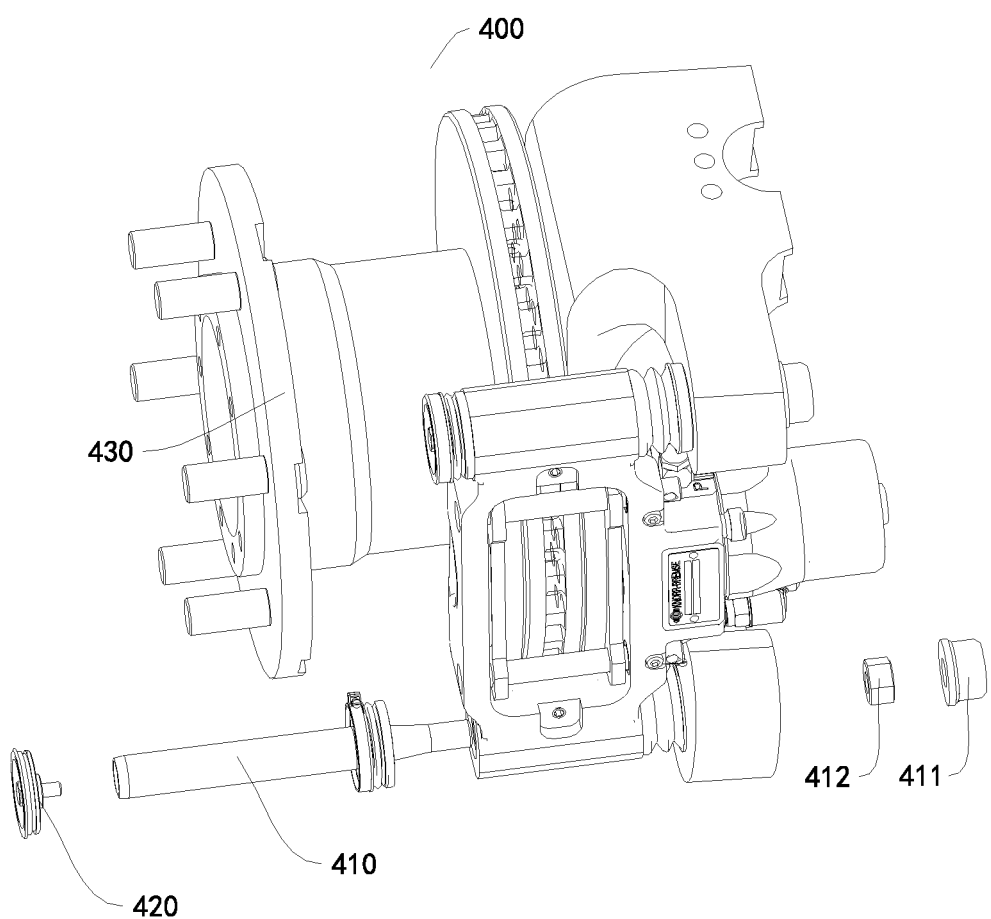
FIG. 12 is an exploded view of a brake of a transaxle of a rail vehicle according to an embodiment of this application.
Figure 13:
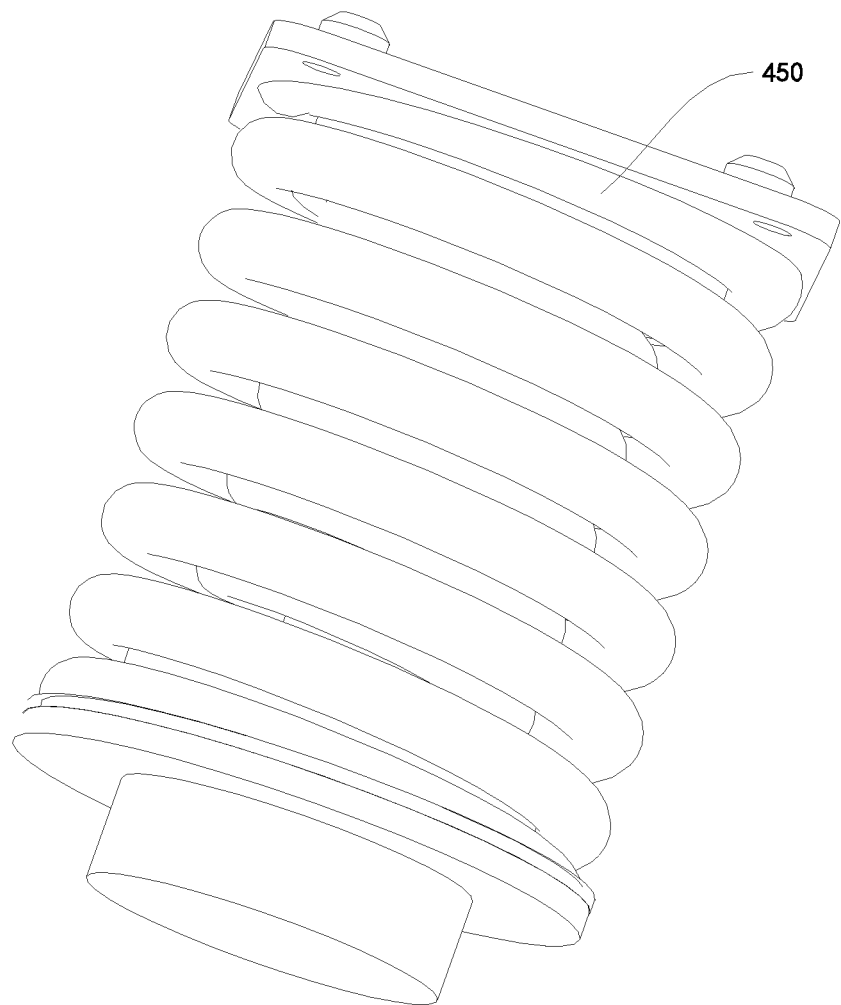
FIG. 13 is a schematic structural diagram of a secondary spring assembly of a transaxle of a rail vehicle according to an embodiment of this application.

Further, as shown in FIG. 12, the transaxle 1 further includes a dust guard 420 that is sleeved over the guiding bolt 410 and is used for preventing dust from touching the surface of the guiding bolt 410. In this way, dust can be prevented from touching the surface of the guiding bolt 410, thereby improving the dust-proof capability of the guiding bolt 410.

Figure 6:
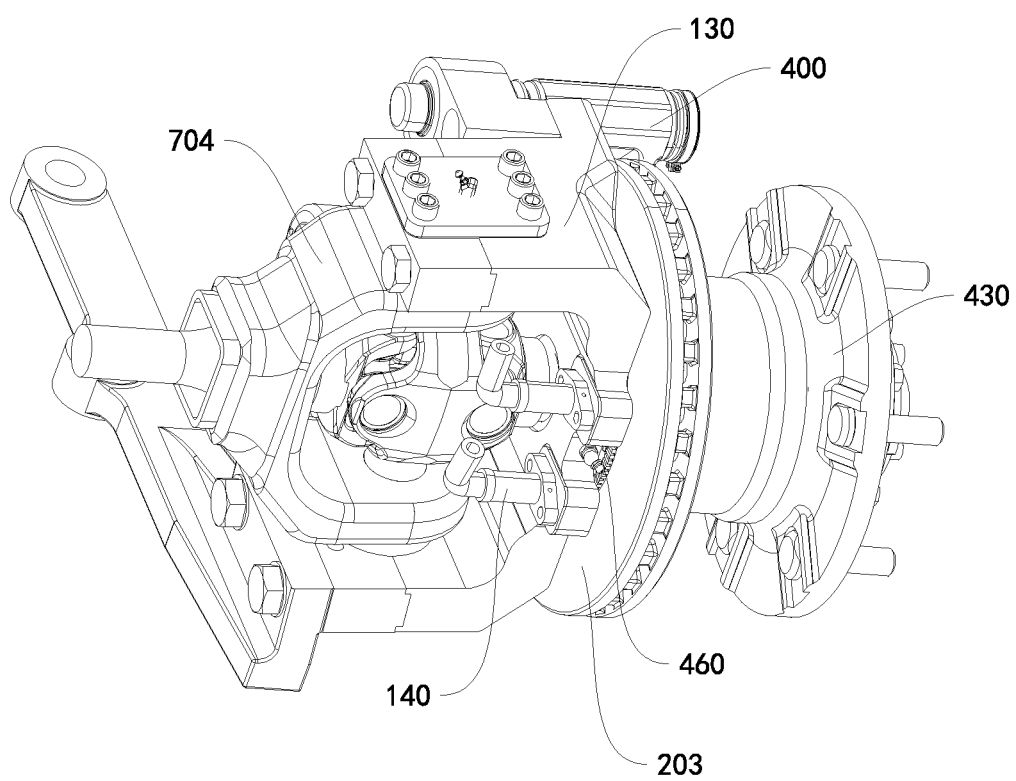
FIG. 6 is a partial schematic structural diagram of a transaxle of a rail vehicle according to an embodiment of this application.

Optionally, as shown in FIG. 6, a wheel speed sensor 140 is disposed on at least one of the left steering knuckle 120 and the right steering knuckle 130. An induction ring gear 460 that rotates along with the running wheel 210 is disposed on the brake 400. The wheel speed sensor 140 detects the rotation of the induction ring gear 460 to detect the rotational speed of the running wheel 210. In this way, the sensitivity and accuracy of detecting the rotational speed of the running wheel 210 can be improved, thereby improving the reliability of controlling the running wheel 210 by the transaxle 1.

Specifically, as shown in FIG. 1 to FIG. 3 and FIG. 8, the transaxle 1 further includes a rear cover assembly 600. The rear cover assembly 600 is mounted on the axle body 100. An oil addition plug 610 is disposed on the rear cover assembly 600. The oil addition plug 610 is used for adding gear lubricating oil to the axle housing 112. An oil discharge plug 620 used for discharging gear lubricating oil is disposed on the bottom wall of the axle body 100. In this way, it is convenient to improve the friction during the working of the transaxle 1, thereby improving the lubrication performance of the transaxle 1.

Optionally, as shown in FIG. 1, FIG. 2, FIG. 5, and FIG. 9, the transaxle 1 further includes a transmission shaft assembly 700. A first end of the transmission shaft assembly 700 is transmission-connected to the power assembly 10 by a spline 710. A second end of the transmission shaft assembly 700 is transmission-connected to the running wheel 210. The transmission shaft assembly 700 is supported on the axle housing assembly 110 and a steering knuckle assembly by a needle roller bearing 720. In this way, it is convenient for the transmission shaft assembly 700 to transfer the driving power of the power assembly 10 to the running wheel 210, so that the running wheel 210 runs stably.

Specifically, the power assembly 10 includes a motor and a main reduction drive, the motor is electrically connected to a battery of the rail vehicle, and an output shaft of the motor is transmission-connected to the transmission shaft assembly 700 by the main reduction drive. In this way, it is convenient for the motor to convert electrical energy into mechanical energy. A torque may be outputted. The torque outputted by the motor is increased by the main reduction drive and then transferred to the transmission shaft assembly 700. The transmission shaft assembly 700 transfers the torque to the wheel hub assembly 430, to drive the running wheel 210 to travel.

Specifically, as shown in FIG. 1 and FIG. 20, two front horizontal wheels 230 are provided, and two rear horizontal wheels 240 are provided. The upper surface of the rail beam 2 is provided with a groove. The two front horizontal wheels 230 respectively abut two sidewalls of the groove, the two rear horizontal wheels 240 respectively abut two sidewalls of the groove. In this way, the distance between the front horizontal wheel 230 and the rear horizontal wheel 240 can be increased, thereby increasing a tilt angle of the rail vehicle during steering, increasing the steering force of the transaxle 1, and making the transaxle 1 steer smoothly. Moreover, the front horizontal wheel 230 and the rear horizontal wheel 240 are conveniently disposed, so that it is convenient to use the groove to position the front horizontal wheel 230 and the rear horizontal wheel 240.

More specifically, as shown in FIG. 1 and FIG. 20, the guiding frame 220 is generally rectangular. The two front horizontal wheels 230 and the two rear horizontal wheels 240 are respectively mounted at four corners of the guiding frame 220. In this way, the shape of the guiding frame 220 can be fully used, thereby increasing the distance between the front horizontal wheel 230 and the rear horizontal wheel 240.

The two front horizontal wheels 230 are disposed near the front end of the guiding frame 220. The two rear horizontal wheels 240 are disposed near the rear end of the guiding frame 220. The two front horizontal wheels 230 and the two rear horizontal wheels 240 are respectively arranged in the width direction of the guiding frame 220 and are symmetrically disposed about a central line in the length direction of the guiding frame 220.

Optionally, as shown in FIG. 1, the transaxle 1 further includes a shock absorber assembly 440. The shock absorber assembly 440 is separately connected to the axle body 100 and the vehicle frame of the rail vehicle. In this way, the shock absorption performance of the transaxle 1 can be improved.

Figure 14:
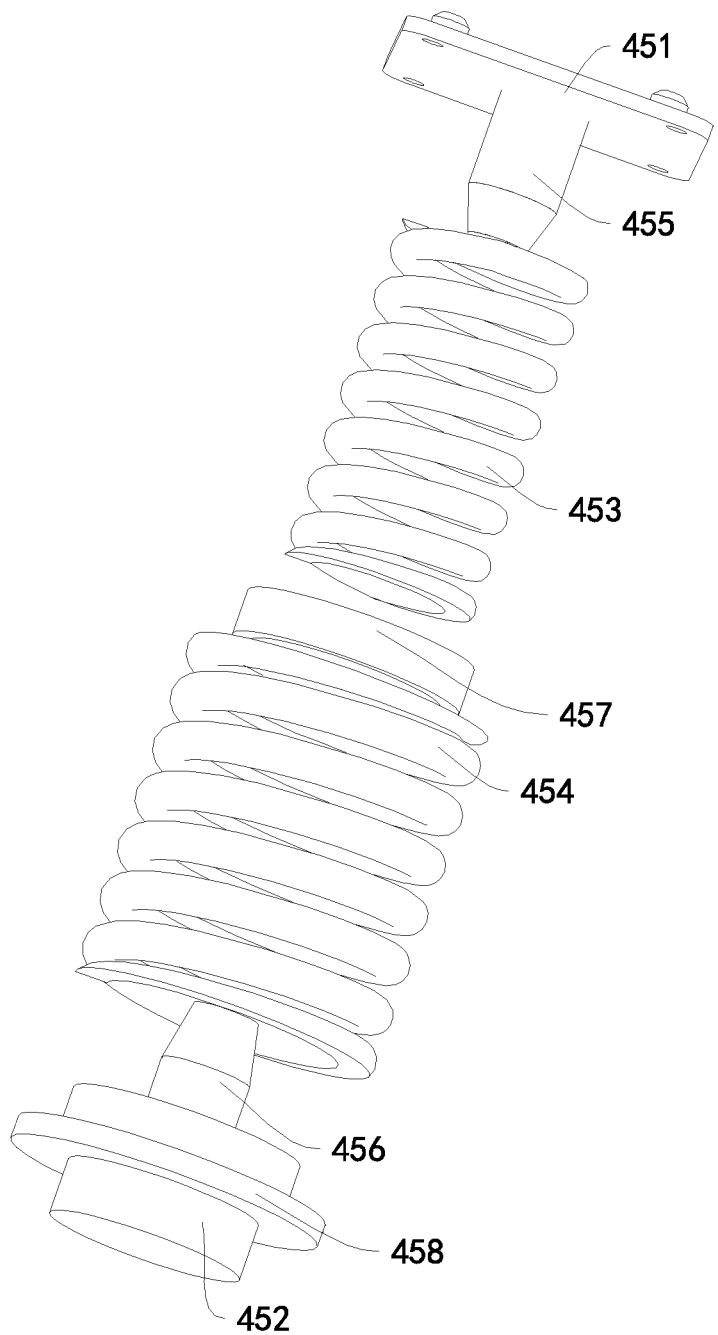
FIG. 14 is an exploded view of a secondary spring assembly of a transaxle of a rail vehicle according to an embodiment of this application.

Specifically, as shown in FIG. 1 and FIG. 14, the transaxle 1 further includes a secondary spring assembly 450. The structure of the secondary spring assembly 450 includes a spring upper base plate 451, a spring lower base plate 452, an auxiliary spring 453, and a main spring 454. The spring upper base plate 451 is mounted on the vehicle frame of the rail vehicle. The lower surface of the spring upper base plate 451 is provided with an upper guiding post 455. The spring lower base plate 452 is connected to the axle body 100. The upper surface of the spring lower base plate 452 is provided with a lower guiding post 456. The auxiliary spring 453 is sleeved over the upper guiding post 455 and the lower guiding post 456. The main spring 454 is sleeved over the auxiliary spring 453. In this way, the upper guiding post 455 and the lower guiding post 456 may be used to respectively guide the auxiliary spring 453 and the main spring 454.

More specifically, as shown in FIG. 14, the secondary spring assembly 450 further includes a spring gasket 457 and a spring spacer 458. The spring upper base plate 451 and the vehicle frame are positioned by a positioning pin and are then locked by a bolt. The upper guiding post 455 is welded on the spring upper base plate 451. The lower guiding post 456 is welded on the spring lower base plate 452. In this way, it is convenient to connect the secondary spring assembly 450 and the vehicle frame, and the space usage and costs are reduced.

Figure 15:
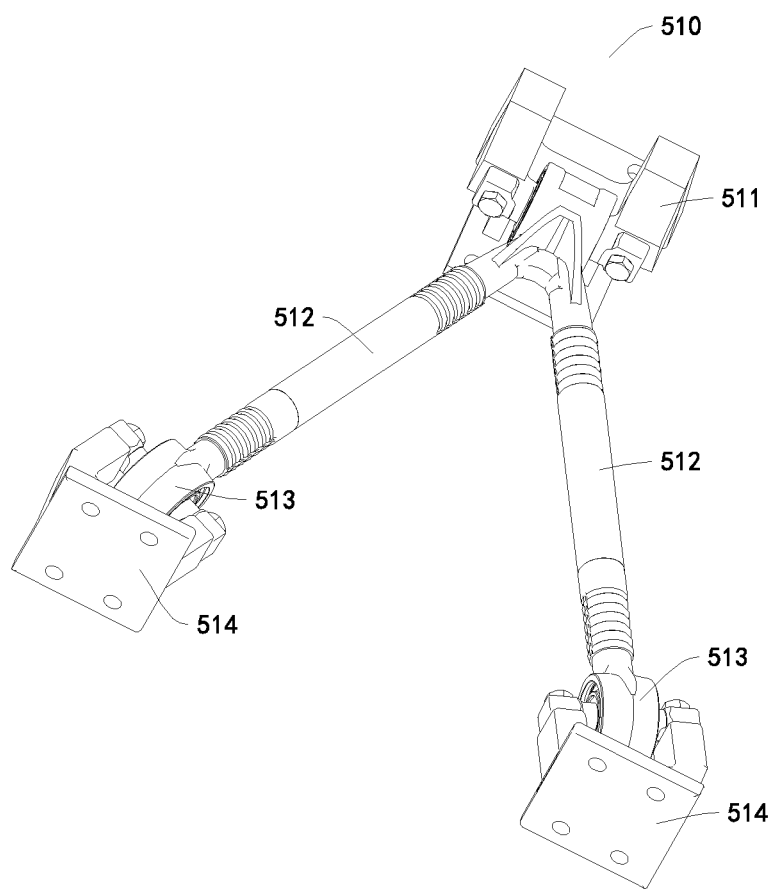
FIG. 15 is a schematic structural diagram of a V-shaped push rod component of a transaxle of a rail vehicle according to an embodiment of this application.

Optionally, as shown in FIG. 1 and FIG. 15, the transaxle 1 further includes a V-shaped push rod component 510. The V-shaped push rod component 510 includes a V push mounting base 511, two V push rod cylinders 512, two V push rod heads 513, and two V push rod head mounting bases 514. The V push mounting base 511 is mounted on the axle body 100. First ends of the two V push rod cylinders 512 are connected to the V push mounting base 511. Second ends of the two V push rod cylinders 512 are far away from each other. The two V push rod heads 513 are separately in threaded cooperation inside the two V push rod cylinders 512. The two V push rod heads 513 are respectively connected to the vehicle frame of the rail vehicle by the two V push rod head mounting bases 514. Specifically, a V-shaped push-rod mounting base plate 118 is disposed on the axle housing assembly 110. The V-shaped push rod component 510 is connected to the V-shaped push-rod mounting base plate 118 by a bolt. In this way, it is convenient for the V-shaped push rod component 510 to transfer power, and the structure of the V-shaped push rod component 510 is compact, so that interference with a stabilizing rod assembly 530 can be avoided. Moreover, it is convenient to adjust the length of the V-shaped push rod component 510.

Figure 16:
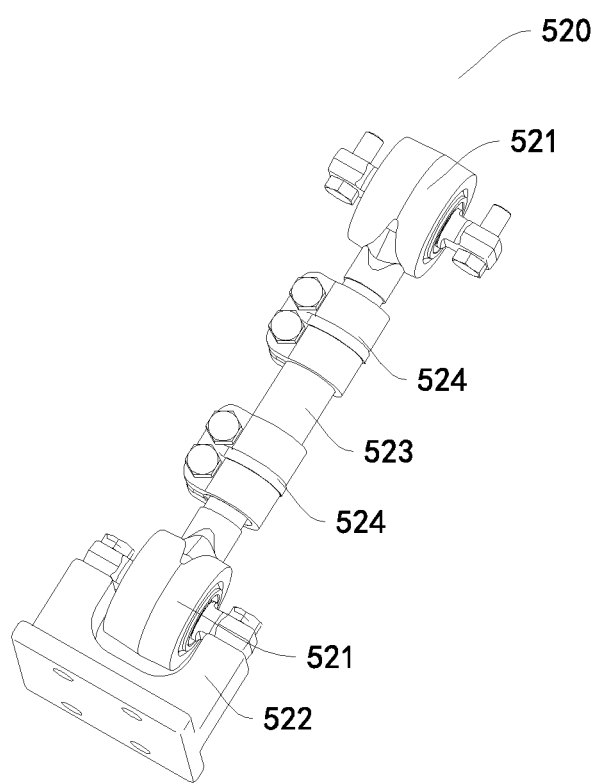
FIG. 16 is a schematic structural diagram of a straight push rod component of a transaxle of a rail vehicle according to an embodiment of this application.
Figure 17:
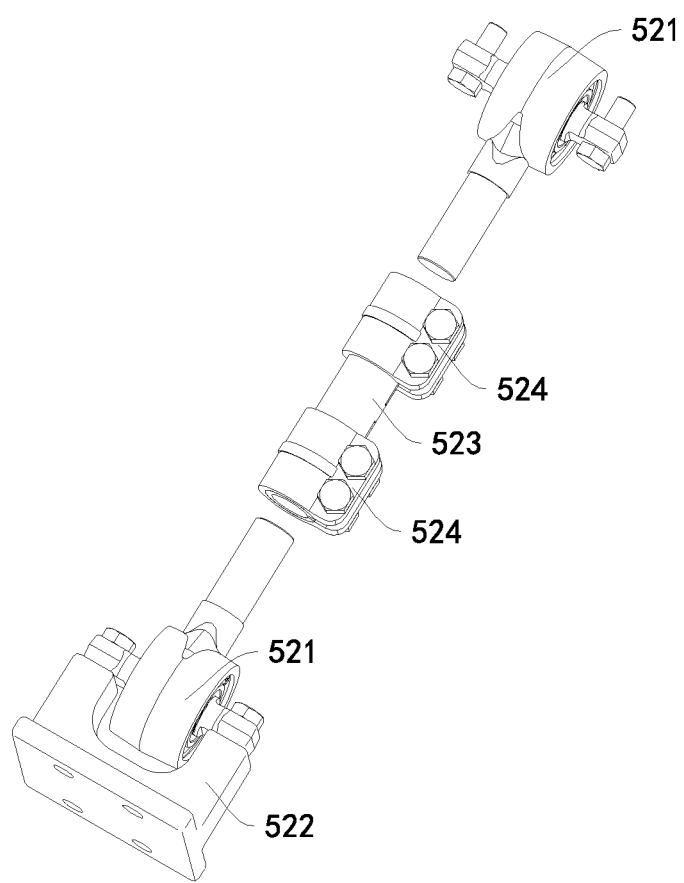
FIG. 17 is an exploded view of a straight push rod component of a transaxle of a rail vehicle according to an embodiment of this application.

Specifically, as shown in FIG. 1 and FIG. 16, the transaxle 1 further includes two straight push rod components 520. Each straight push rod component 520 includes two straight push rod heads 521, a straight push rod head mounting base 522, a straight push rod cylinder 523, and two locking bushings 524. One of the two straight push rod heads 521 is mounted on the axle body 100. The other of the two straight push rod heads 521 is mounted on the vehicle frame of the rail vehicle by the straight push rod head mounting base 522. The two straight push rod heads 521 are respectively in cooperation inside two ends of the straight push rod cylinder 523. The two locking bushings 524 are used for locking connections between the straight push rod cylinder 523 and the straight push rod heads 521. The two locking bushings 524 are sleeved over the straight push rod cylinder 523 and are separately disposed at two ends of the straight push rod cylinder 523. Specifically, the distance between the straight push rod head 521 and the straight push rod cylinder 523 is adjusted, and the locking bushing 524 is then tightened by a bolt. The straight push rod head mounting base 522 is connected to the vehicle frame. In this way, the straight push rod component 520 is conveniently disposed, so that it is convenient to fix the length of the straight push rod component 520.

Figure 18:
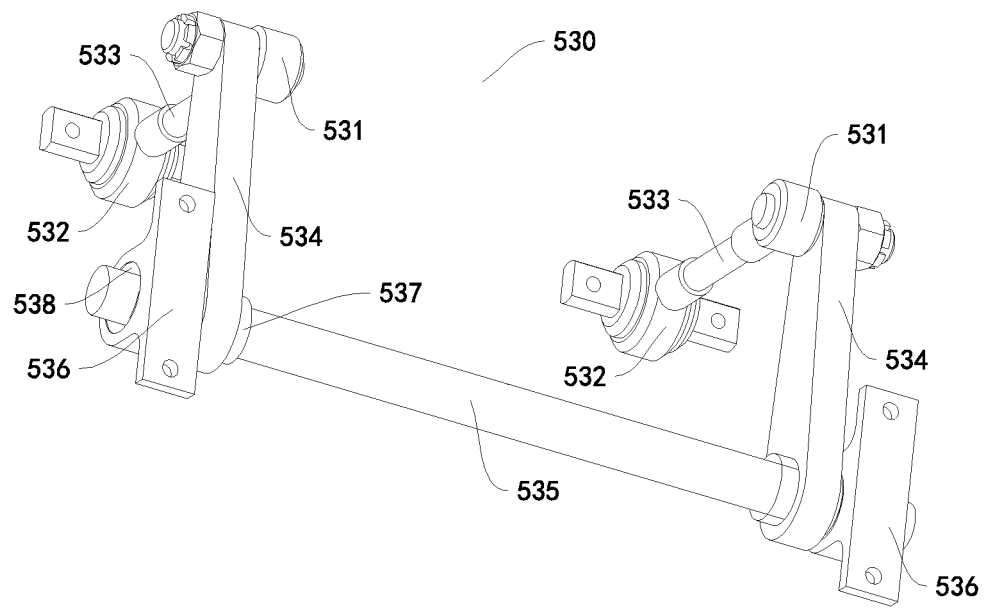
FIG. 18 is a schematic structural diagram of a stabilizing rod assembly of a transaxle of a rail vehicle according to an embodiment of this application.

Optionally, as shown in FIG. 1 and FIG. 18, the transaxle 1 further includes a stabilizing rod assembly 530. The stabilizing rod assembly 530 includes two stabilizing rod sleeves 531, two stabilizing rod heads 532, two stabilizing rod connecting rods 533, two swing rods 534, a stabilizing rod body 535, and two stabilizing rod mounting support bases 536. The stabilizing rod head 532 is mounted on the axle body 100. Two ends of each stabilizing rod connecting rod 533 are respectively in threaded cooperation inside the stabilizing rod head 532 and the stabilizing rod sleeve 531. A first end of each swing rod 534 is pivotally connected to the stabilizing rod sleeve 531. A second end of the swing rod 534 is provided with a through hole. Two ends of the stabilizing rod body 535 separately pass through the two through holes. Two ends of the stabilizing rod body 535 are respectively mounted on the vehicle frame of the rail vehicle by the two stabilizing rod mounting support bases 536. In this way, it is convenient to improve the structural stability of the transaxle 1, thereby improving the running reliability of the rail vehicle.

Further, as shown in FIG. 18, the stabilizing rod assembly 530 further includes a swing rod shaft sleeve 537 and a support base shaft sleeve 538. An external thread on the stabilizing rod connecting rod 533 is connected to internal threads of the stabilizing rod head 532 and the stabilizing rod sleeve 531, and the length is adjusted. The stabilizing rod body 535 is connected to the swing rod 534 by the swing rod shaft sleeve 537, and is then locked on the vehicle frame through the stabilizing rod mounting support base 536 and the support base shaft sleeve 538 by a bolt connection. In this way, the stabilizing rod assembly 530 is conveniently disposed, so that it is convenient to adjust the length of the stabilizing rod assembly 530.

Figure 19:
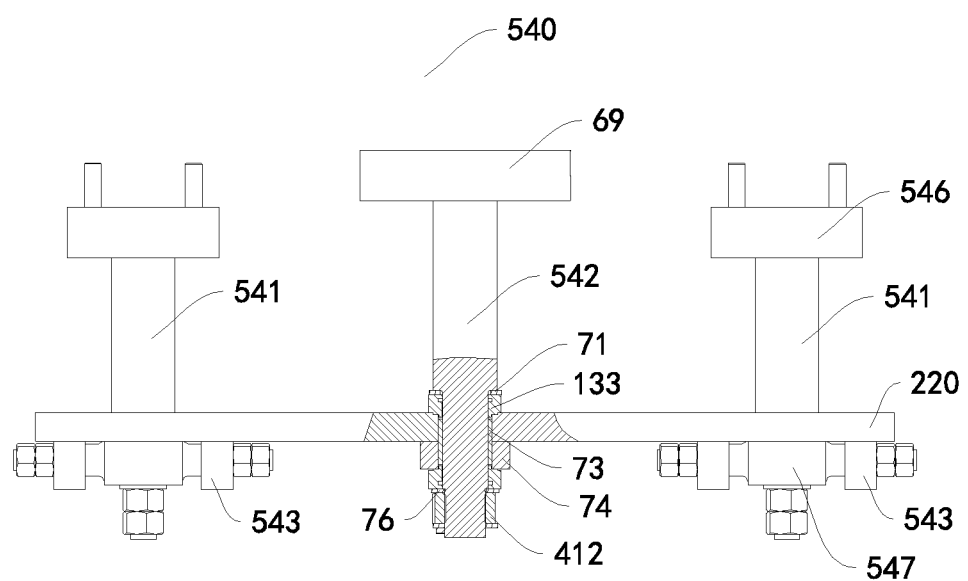
FIG. 19 is a partial sectional view of a support post assembly of a transaxle of a rail vehicle according to an embodiment of this application.

Specifically, as shown in FIG. 1 and FIG. 19, the transaxle 1 further includes a support post assembly 540. The support post assembly 540 includes two auxiliary support posts 541, a main support post 542, and two guiding frame support wheels 543. A first end of each auxiliary support post 541 is mounted on the axle body 100. A first end of the main support post 542 is mounted on the axle body 100. A second end of the main support post 542 is axially rotatably mounted on the guiding frame 220. The guiding frame 220 is provided with a chute. A second end of each auxiliary support post 541 passes through the chute to be connected to the guiding frame support wheel 543. The guiding frame 220 is supported on the guiding frame support wheel 543. In this way, the guiding frame 220 is conveniently disposed, so that the guiding frame 220 rotates smoothly.

In a specific embodiment according to this application, the entire structure of the transaxle 1 includes a wheel hub assembly 430, a brake 400, a shock absorber assembly 440, an axle body 100, a secondary spring assembly 450, a running wheel 210, a front horizontal wheel 230, a rear horizontal wheel 240, a stabilizing rod assembly 530, a connecting rod component 300, a support post assembly 540, a V-shaped push rod component 510, and a straight push rod component 520. First ends of the shock absorber assembly 440, the secondary spring assembly 450, the stabilizing rod assembly 530, the V-shaped push rod component 510, and the straight push rod component 520 are mounted on the axle body 100 and second ends thereof are mounted on the vehicle frame for transfer, support, and stabilization. The front horizontal wheel 230 and the rear horizontal wheel 240 are mounted on the connecting rod component 300 by a horizontal wheel mounting component 250. The two front horizontal wheels 230 and the two rear horizontal wheels 240 steer by guiding wheels along the inner side of the rail beam 2.

The axle body 100 includes an axle housing assembly 110, a left steering knuckle 120, a right steering knuckle 130, a left steering arm 320, and a right steering arm 330. The left steering knuckle 120 and the right steering knuckle 130 are connected to the axle housing assembly 110 by an upper pin shaft and a lower pin shaft. The left steering arm 320 and the right steering arm 330 are respectively connected to the axle housing assembly 110 and the steering knuckle by bolts. The axle housing assembly 110 is formed by welding the right half-axle fork 111, an upper leaf-spring base 1191, a lower leaf-spring base 1192, the axle housing 112, the V-shaped push-rod mounting base plate 118, a gasket 1193, the left half-axle fork 113, a support post mounting base plate 544, and a support tube 545.

The left steering knuckle 120 and the right steering knuckle 130 connect the fixing block 121, the upper pin shaft, the main pin end-face cover 122, the copper sleeve 123, the lower pin shaft, and the push cylindrical roller bearing 133 to the left and right half-axle forks by bolts.

The brake 400 is locked on the wheel hub assembly 430 and the left and right steering knuckles by the guiding bolt 410, and a nut cover 411, a locking nut 412, and the dust guard 420 are then used to prevent dust from entering the surface of the guiding bolt 410 to prevent the impact on the slide of the clamp body of the brake 400.

The secondary spring assembly 450 includes a spring upper base plate 451, an upper guiding post 455, a lower guiding post 456, an auxiliary spring 453, a spring gasket 457, a main spring 454, a spring base plate 458, and a spring lower base plate 452. A positioning pin on the spring upper base plate 451 and the vehicle frame are positioned and are then locked by a bolt. The upper guiding post 455 is welded on the spring upper base plate 41. The spring lower base plate 452 is welded on the upper leaf-spring base 1191.

The V-shaped push rod component 510 includes a V push mounting base 511, a V push rod cylinder 512, a V push rod head 513, and a V push rod head mounting base 514. The V push mounting base 511 is connected to the V-shaped push-rod mounting base plate 118 on the axle housing 112 by a bolt. An external thread on the V push rod head 513 is connected to an internal thread on the V push rod cylinder 512, to facilitate length adjustment. The V push rod head 513 is locked on the V push mounting base 511 and the V push rod head mounting base 514 by bolts. The V push rod head mounting base 514 is connected to the vehicle frame by a bolt.

The straight push rod component 520 includes a straight push rod head 521, a straight push rod cylinder 523, a locking bushing 524, and a straight push rod head mounting base 522. The straight push rod head 521 is locked on the lower leaf-spring base 1192 and the straight push rod head mounting base 522 by bolts. The distance between the straight push rod head 521 and the straight push rod cylinder 523 is adjusted, and the locking bushing 524 is then tightened by a bolt to fix the length of the straight push rod component 520. The straight push rod head mounting base 522 is connected to the vehicle frame.

The structure of the stabilizing rod assembly 530 includes a stabilizing rod head 532, a stabilizing rod connecting rod 533, a stabilizing rod sleeve 531, a stabilizing rod body 535, a swing rod shaft sleeve 537, a stabilizing rod mounting support base 536, a support base shaft sleeve 538, and a swing rod 534. The stabilizing rod head 532 is locked on the lower leaf-spring base 1192 by a bolt. An external thread on the stabilizing rod connecting rod 533 is connected to internal threads of the stabilizing rod head 532 and the stabilizing rod sleeve 531 and the length is adjusted. The stabilizing rod body 535 is connected to the swing rod 534 by the swing rod shaft sleeve 537 and is then locked on the vehicle frame through the stabilizing rod mounting support base 536 and the support base shaft sleeve 538 by bolts.

The support post assembly 540 includes an auxiliary support post 541, a main support post 542, an auxiliary support post mounting base 546, a guiding frame 220, a guiding frame support wheel 543, a guiding frame support wheel bracket 547, a main support post mounting base 69, a bearing spacer 71, a push cylindrical roller bearing 133, a support post copper sleeve 73, a support post packing block 74, a locking nut 412, and a lock spacer 76. The auxiliary support post mounting base 546 and the main support post mounting base 69 are locked on the axle housing lower leaf-spring base 1192 and the support post mounting base plate 544 by bolts. The main support post 542 is locked on the guiding frame 220 by the two push cylindrical roller bearings 133, the support post copper sleeve 73, the support post packing block 74, and the locking nut 412. The locking nut 412 is fixed by the lock spacer 76 and a bolt to prevent loosening. The auxiliary support post 541 is fixed on the guiding frame 220 by the guiding frame support wheel 543 and the guiding frame support wheel bracket 547. Two nuts are used to respectively lock two ends of the guiding frame support wheel bracket 547 to prevent loosening.

The connecting rod component 300 includes a mounting base 222, a first transverse pull rod 310, a second transverse pull rod 340, and a horizontal wheel mounting component 250. The mounting base 222 is locked on the guiding frame 220 by a bolt. The first end of the first transverse pull rod 310 is locked on the mounting base 222. The second end of the first transverse pull rod 310 is locked on the left steering arm 320.

A first end of the second transverse pull rod 340 is locked on the left steering arm 320. A second end of the second transverse pull rod 340 is locked on the right steering arm 330. Four horizontal wheels are mounted on the guiding frame 220 by the horizontal wheel mounting component 250.

In a specific embodiment according to this application, the entire structure of the transaxle 1 includes an axle housing assembly 110, a power assembly 10, a rear cover assembly 600, a wheel hub assembly 430, a brake 400, a transmission shaft assembly 700, a left steering knuckle 120, a right steering knuckle 130, a left pin shaft, a right pin shaft, a wheel hub end cover 19, a shock absorber assembly 440, a secondary spring assembly 450, a guiding frame 220, a front horizontal wheel 230, a rear horizontal wheel 240, a stabilizing rod assembly 530, a left steering arm 320, a right steering arm 330, a connecting rod component 300, a support post assembly 540, a V-shaped push rod component 510, a straight push rod component 520, and a stabilizing rod assembly 530.

Figure 5:
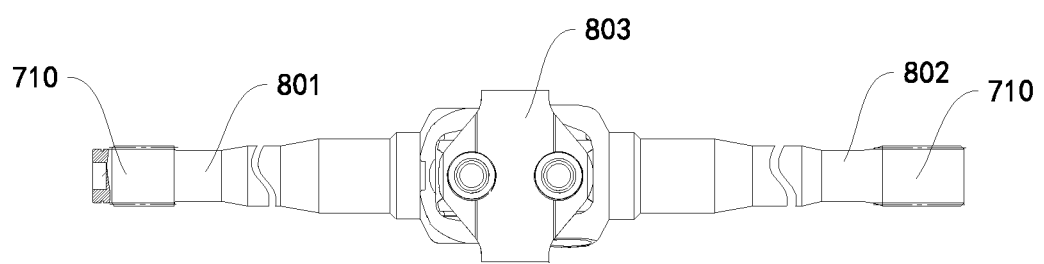
FIG. 5 is a schematic structural diagram of a transmission shaft assembly of a transaxle of a rail vehicle according to an embodiment of this application.

The power assembly 10 is connected to a front base plate 708 of the axle housing assembly 110 by a bolt. The rear cover assembly 600 is connected to a rear base plate 707 of the axle housing assembly 110 by a bolt. The first end of the transmission shaft assembly 700 is connected to the power assembly 10 by the spline 710. The second end of the transmission shaft assembly 700 is connected to the wheel hub end cover 19 by the spline 710. The transmission shaft assembly 700 is supported on the axle housing assembly 110 and the steering knuckle by the needle roller bearing 720. As shown in FIG. 5, the transmission shaft assembly 700 includes a wheel-hub near-end spline shaft 801, a wheel-hub far-end spline shaft 802, and a universal joint 803. The left pin shaft and the right pin shaft are respectively connected to the left half-axle fork 113 and the right half-axle fork 111 on the axle housing assembly 110. An inner ring of a rolling bearing 42 of the wheel hub assembly 430 cooperates with the steering knuckle axially, and the wheel hub assembly 430 is mounted on the steering knuckle by the locking nut 412. The wheel hub assembly 430 is rotatable around the axis of the steering knuckle. The steering knuckle is rotatable around the axis of a pin shaft relative to the axle housing assembly 110. Therefore, the wheel hub assembly 430 is rotatable around the pin shaft and is rotates around the axis of the steering knuckle, to implement the travel and steering of the running wheel 210. The wheel hub end cover 19 is mounted on the wheel hub assembly 430 by a bolt. The spline shaft 801, away from a wheel hub end, of the transmission shaft assembly 700 is provided with a trench. An axial elastic stop ring is used to limit an axial movement on one side of the transmission shaft assembly 700. An end, near the spline shaft 801 of the wheel hub end, of the transmission shaft assembly 700 is provided with a limit block 23. The limit block 23 cooperates with a limit end cover 22 to limit an axial movement on the other side of the transmission shaft. The limit end cover 22 is connected to the wheel hub assembly 430 by a bolt. The brake 400 is mounted on the steering knuckle by a bolt. A brake disc 203 is mounted on the wheel hub assembly 430. A friction disc of the brake 400 contacts the brake disc 203 on the wheel hub assembly 430 to generate frictional resistance, to implement the braking of the entire vehicle. The running wheel 210 is mounted on the wheel hub assembly 430 by a bolt. The running wheel 210 supports the total weight of the entire vehicle to transfer the driving power or braking force to the ground to enable the rail vehicle to run.

The wheel speed sensor 140 is mounted on the steering knuckle. The induction ring gear 460 is mounted on the brake disc 203. When the running wheel 210 rotates, the induction ring gear 460 synchronously rotates with the running wheel 210. The wheel speed sensor 140 can detect wheel speed information according to this.

The power assembly 10 is formed by a motor and a main reduction drive. A three-phase cable on the motor is connected to a power battery of the rail vehicle. The motor converts electrical energy into mechanical energy. A torque is outputted. The torque outputted by a shaft of the motor is increased by the main reduction drive and then transferred to the transmission shaft assembly 700. The transmission shaft assembly 700 transfers the torque to the wheel hub assembly 430, to drive the running wheel 210 to travel.

The structure of the axle housing assembly 110 includes an axle housing 112, a front base plate 708, a rear base plate 707, a right half-axle fork 111, a left half-axle fork 113, a shock absorption spring mounting base 701, a straight push-rod mounting base 704, a shock absorber mounting base 706, a guiding frame support post mounting base 705, and a V push mounting base 511. The half-axle fork is welded at a left end and a right end of the axle housing 112. The shock absorption spring mounting base 701 is welded above the axle housing 112. The straight push-rod mounting base 704 is welded below the axle housing 112. The shock absorber mounting base 706 is welded on the straight push-rod mounting base 704. The V push mounting base 511 is welded at the top of the axle housing 112. The guiding frame support post mounting base 705 is welded at the bottom of the axle housing 112. The shock absorption spring mounting base 701 and the straight push-rod mounting base 704 are further connected together by a hex cap bolt to be securely fixed on the axle housing 112. In addition, to prevent the shock absorption spring mounting base 701 or the straight push-rod mounting base 704 from deformation under the action of a force in a pretightening process of the hex cap bolt. Particularly, the support tube 545 should be added between the shock absorption spring mounting base 701 and the straight push-rod mounting base 704. The hex cap bolt sequentially passes through the shock absorption spring mounting base 701, the support tube 545, and the straight push-rod mounting base 704.

The oil discharge plug 610 is mounted on the rear cover assembly 600 and is used for adding gear lubricating oil to the axle housing 112 to lubricate gears of the main reduction drive. The gear lubricating oil ensures that a gear pair can work normally. The oil discharge plug 620 is correspondingly mounted at the bottom of the axle housing assembly 110 and is used for periodically replacing gear oil.

Figure 7:
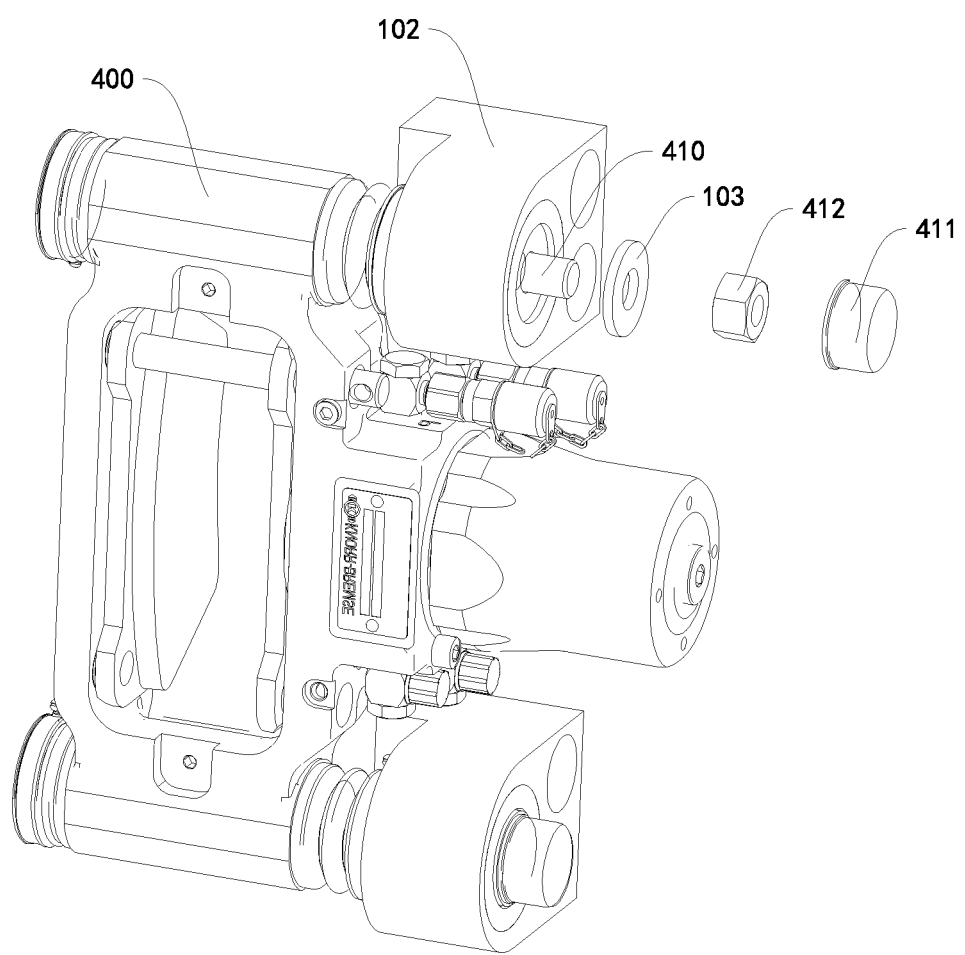
FIG. 7 is a partial exploded view of a transaxle of a rail vehicle according to an embodiment of this application.
Figure 8:
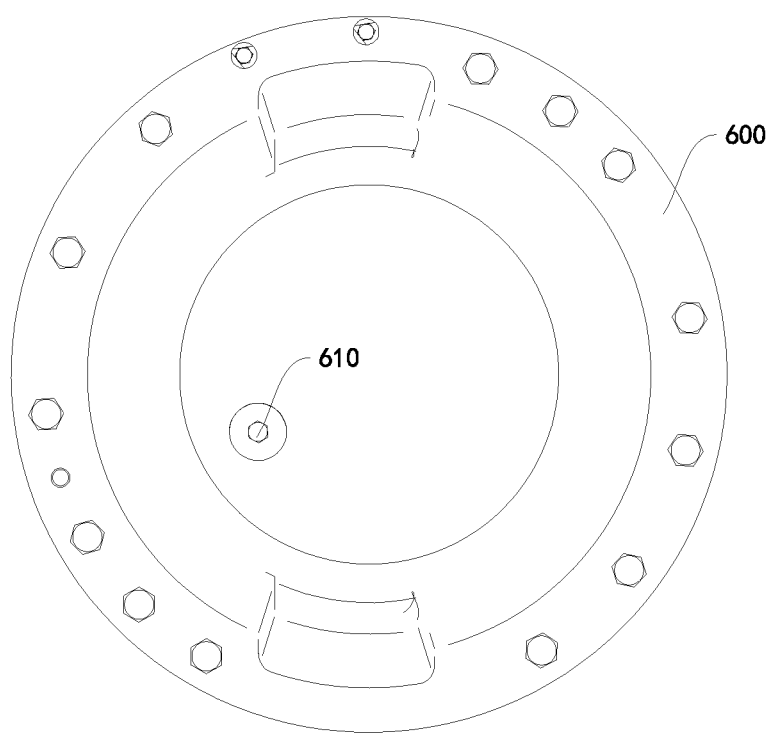
FIG. 8 is a schematic structural diagram of a rear cover assembly of a transaxle of a rail vehicle according to an embodiment of this application.

As shown in FIG. 7, a brake assembly includes a brake 400, a brake mounting base 102, a spacer 103, a locking nut 412, and a nut cover 411. Specifically, the brake 400 is mounted on the brake mounting base 102 through the cooperation between the guiding bolt 410 and the locking nut 412 included in the brake 400. The brake mounting base 102 is fixed on the steering knuckle by a bolt, so that the brake 400 is mounted on the steering knuckle. To prevent dust from entering the brake 400, the nut cover 411 is added outside the locking nut 412.

As shown in FIG. 1, FIG. 2, FIG. 5, FIG. 9, and FIG. 11, the steering knuckle is mounted on the axle housing assembly 110 by a pin shaft. Specifically, the pin shaft is pressed in a pin hole of the half-axle fork in an interference fit. The copper sleeve 123 and a rubber oil seal 27 are mounted between the steering knuckle and the pin shaft. A push bearing and a gap adjustment spacer 43 are mounted between the steering knuckle and the half-axle fork. A main pin fixing block 39 is then fixed on the steering knuckle by a bolt, so that the steering knuckle is mounted on the half-axle fork. A main pin cap 37 is fixed on the steering knuckle and the half-axle fork by a bolt. A grease nipple 38 is mounted on the main pin cap 37. After the assembly of the transaxle 1 is completed, lubricating grease needs to be injected from the grease nipple 38. The lubricating grease is used for lubricating the pin shaft, thereby reducing the frictional force between the copper sleeve 123 and the pin shaft during steering movement. Particularly, before the steering knuckle is mounted, the wheel-hub far-end spline shaft 802 of the transmission shaft assembly 700 should first pass through the half-axle fork to be mounted in the power assembly 10. The wheel-hub near-end spline shaft 801 of the transmission shaft assembly 700 then passes through the steering knuckle shaft, to ensure the mounting of the transmission shaft assembly 700. The wheel-hub far-end spline shaft 802 of the transmission shaft assembly 700 is connected to the power assembly 10 by the spline 710, so that a torque outputted by the power assembly 10 can be transferred to the transmission shaft assembly 700. The wheel-hub near-end spline shaft 801 of the transmission shaft assembly 700 is connected to the wheel hub end cover 19 by the spline 710. The wheel hub end cover 19 is connected to the wheel hub assembly 430 by a bolt. The transmission shaft assembly 700 transfers the torque outputted by the power assembly 10 to the wheel hub assembly 430, to drive the rail vehicle to travel. The wheel hub assembly 430 is rotatable around the axis of the steering knuckle. The steering knuckle is rotatable around the axis of the pin shaft relative to the half-axle fork. Therefore, the wheel hub assembly 430 is rotatable around the axis of the pin shaft and rotates around the axis of the steering knuckle, to implement the travel and steering of the running wheel 210. The axis of the pin shaft is an axis determined by central lines of the upper and lower pin shafts. An intersection between the axis of the pin shaft and the axis of the steering knuckle coincides with an intersection between the axis of the pin shaft and the center of the universal joint 803. This is a prerequisite for the stable steering of the transaxle 1. The axis of the steering knuckle is an axis determined by the rotational axes of the left steering knuckle 120 and the right steering knuckle 130. That is, the wheel hub assembly 430 is rotatable around the axis determined by the central lines of the upper and lower pin shafts and is rotatable around the axis determined by the rotational axes of the left steering knuckle 120 and the right steering knuckle 130.

The first end of the left steering arm 320 is connected to the axle housing assembly 110 by a bolt. The second end of the left steering arm 320 is connected to the second transverse pull rod 340 by a ball joint. The first end of the right steering arm 330 is connected to the axle housing assembly 110 by a bolt. The second end of the right steering arm 330 is connected to the second transverse pull rod 340 by a ball joint. A middle portion of the left steering arm 320 is connected to the first transverse pull rod 310 by a ball joint. The second end of the first transverse pull rod 310 is connected to the guiding frame 220 by a ball joint. The guiding frame 220 includes a horizontal wheel. The horizontal wheel can guide the guiding frame 220 to travel in a rail direction. The guiding frame 220 is mounted on the axle housing assembly 110 by a guiding frame support post 34, a guiding frame clamping block 32, and the locking nut 412. The guiding frame support wheel 543 is further mounted at the lower portion of the guiding frame 220. The guiding frame support wheel 543 is mounted on the auxiliary support post 541. The auxiliary support post 541 is mounted on the axle housing assembly 110 by the auxiliary support post mounting base 546. A mounting base of the auxiliary support post 541 is locked on the axle housing assembly 110 by a bolt. A push bearing is separately mounted between the axle housing assembly 110 and the guiding frame 220 and between the guiding frame clamping block 32 and the locking nut 412, so that when the rail vehicle steers, the axle housing assembly 110 can move along the guiding frame 220, to guide the rail vehicle to travel in the rail direction.

The first end of the shock absorber assembly 440 is mounted on the shock absorber mounting base 706 of the axle housing assembly 110. The second end of the shock absorber assembly 440 is mounted on the vehicle frame. The first end of the secondary spring assembly 450 is mounted on the shock absorption spring mounting base 701 of the axle housing assembly 110. The second end of the secondary spring assembly 450 is mounted on the vehicle frame. The first end of the stabilizing rod assembly 530 is mounted on the axle housing assembly 110. The second end of the stabilizing rod assembly 530 is mounted on the vehicle frame. The first end of the V-shaped push rod component 510 is mounted on the axle housing assembly 110. The second end of the V-shaped push rod component 510 is mounted on the vehicle frame. The first end of the straight push rod component 520 is mounted on the straight push-rod mounting base 704 of the axle housing assembly 110. The second end of the straight push rod component 520 is mounted on the vehicle frame. The shock absorber assembly 440 and the secondary spring assembly 450 can improve the travel smoothness and maneuver stability of the vehicle, to reduce the degree of resonance and attenuate vibration. The secondary spring assembly 450 is an elastic component in a suspension system, and is mainly used for transferring a vertical force and buffer impact and shock. The stabilizing rod assembly 530 reduces the tilt of the vehicle and improve the travel smoothness. The V-shaped push rod component 510 and the straight push rod component 520 are used for transferring a pushing force and improving the stability of the vehicle.

The working process of the transaxle 1 according to this embodiment of this application is described below in detail with reference to the accompanying drawings.

When the rail vehicle travels, the front horizontal wheel 230 and the rear horizontal wheel 240 run along the inner side of the rail beam 2. When the transaxle 1 needs to steer, under the action of the rail beam 2, the front horizontal wheel 230 and the rear horizontal wheel 240 drive the guiding frame 220 to rotate and drive the first transverse pull rod 310. The second transverse pull rod 340 is driven by the first transverse pull rod 310 to transfer the steering force to the left steering arm 320 or the right steering arm 330. The left steering arm 320 or the right steering arm 330 correspondingly drives the running wheel 210 on the left side or the running wheel 210 on the right side to rotate, to implement the steering of the rail vehicle and implement the self-steering function of the transaxle 1, thereby facilitating the steering of the rail vehicle.

A rail vehicle according to an embodiment of this application is described below. The rail vehicle in the embodiment according to this application includes the transaxle 1 of the rail vehicle in the foregoing embodiment according to this application.

For the rail vehicle in the embodiment according to this application, the transaxle 1 of a rail vehicle in the embodiment according to this application is used, and the transaxle has advantages such as self-guidance and high applicability.

A rail transportation system according to an embodiment of this application is described below. The rail system in the embodiment according to this application includes the rail vehicle in the foregoing embodiment according to this application.

For the rail transportation system in the embodiment according to this application, the rail vehicle in the embodiment according to this application is used, and the transaxle has advantages such as self-guidance and high applicability.

Other structures and operations of the rail vehicle according to the embodiments of this application are known to a person of ordinary skill in the art. Details are not described herein again.

In the description of this application it needs to be understood that orientation or location relationships indicated by terms "center", "longitudinal", "transverse", "length", "width", "thickness", "up", "down", "front", "rear", "left", "right", "vertical", "horizontal", "top", "bottom", "inside", "outside", "clockwise", "counterclockwise", "axial", "radial", and "circumferential" are based on orientation or location relationships shown in the accompanying drawings and are only used to facilitate description of this application and simplify description but are not used to indicate or imply that the apparatuses or elements must have specific orientations or are constructed and operated by using specific orientations and therefore cannot be understood as a limitation to this application. In addition, when features are defined by "first" and "second", one or more such features can be explicitly or implicitly included. In the description of this application, unless otherwise particularly defined, "a plurality of" means two or more than two.

In the description of this application, it should be noted that unless otherwise expressly specified and defined terms such as "mounted", "connected", "connection" should be understood in a broad sense, for example, fixedly connected detachably connected or integrally connected; or connected mechanically or electrically; or connected directly or through an intermediate or two elements communicated internally. For persons of ordinary skill in the art, specific meanings of the terms in this application should be understood according to specific conditions.

In the description of this specification, the description of reference terms such as "an embodiment", "some embodiments", "schematic embodiments", "examples", "specific examples" or "some examples" means that specific features, structures, materials or characteristics that are described with reference to the embodiments or examples are included in at least one embodiment or example of this specification. In this specification, the schematic description of the foregoing terms is not required to involve a same embodiment or example. Moreover, the described specific features, structures, materials or characteristics may be combined in an appropriate manner in any one or more embodiments or examples.

Although the embodiments of this application have been shown and described, a person of ordinary skill in the art may understand that various changes, modifications, replacements, and variations may be made to these embodiments without departing from the principle and spirit of this application, and the scope of this application is defined by the claims and equivalents thereof.

What is claimed is:

1. A transaxle of a rail vehicle, comprising:
   a power assembly;
   an axle body, connected to a vehicle frame of the rail vehicle;
   a running wheel, rotatable in an axial direction of the running wheel and transversely swingably mounted on the axle body, wherein the running wheel is supported on a rail beam along which the rail vehicle travels, the power assembly is transmission-connected to the running wheel to drive the running wheel to rotate;
   a guiding frame, mounted on the axle body and rotatable relative to the axle body in a horizontal direction;
   a horizontal wheel, disposed on the guiding frame; and
   a connecting rod component, comprising a first transverse pull rod and a second transverse pull rod, wherein the first transverse pull rod is pivotally mounted on the guiding frame, the second transverse pull rod is respectively transmission-connected to the first transverse pull rod and the running wheel, the first and second transverse pull rods being longitudinally spaced apart and extending in a transverse direction between left and right sides of the transaxle, wherein
   when the rail vehicle turns left, the horizontal wheel cooperates with the rail beam to drive the guiding frame to swing and to drive the first transverse pull rod to move together, and the second transverse pull rod is driven by the first transverse pull rod to drive the running wheel to swing to the left, and
   when the rail vehicle turns right, the horizontal wheel cooperates with the rail beam to drive the guiding frame to swing and to drive the first transverse pull rod to move together, and the second transverse pull rod is driven by the first transverse pull rod to drive the running wheel to swing to the right.

2. The transaxle of a rail vehicle according to claim 1, wherein the connecting rod component further comprises:
   a left steering arm and a right steering arm, wherein a first end of the first transverse pull rod is pivotally mounted on the guiding frame, the left steering arm and the right steering arm are respectively located on two sides of the guiding frame, a first end of the left steering arm is transmission-connected to one of the running wheels that is located on the left side, a first end of the right steering arm is transmission-connected to one of the running wheels that is located on the right side, a second end of the first transverse pull rod is pivotally connected to the middle of one of the left steering arm and the right steering arm, a second end of the left steering arm and a second end of the right steering arm are respectively pivotally connected to two ends of the second transverse pull rod, the first transverse pull rod is transmission-connected to the second transverse pull rod by one of the left steering arm and the right steering arm.

3. The transaxle of a rail vehicle according to claim 2, wherein the guiding frame comprises a frame body and a mounting base mounted on the frame body, and the first transverse pull rod is pivotally mounted on the mounting base, wherein the mounting base is disposed at a right edge adjacent to the frame body, and the first transverse pull rod is pivotally connected to the left steering arm.

4. The transaxle of a rail vehicle according to claim 2, wherein the axle body further comprises:
   an axle housing assembly; and
   a left steering knuckle and a right steering knuckle, wherein the left steering knuckle is pivotally connected to the axle housing assembly by a left pin shaft, the right steering knuckle is pivotally connected to the axle housing assembly by a right pin shaft, the two running wheels are respectively rotatably mounted on the left steering knuckle and the right steering knuckle, the left steering arm is connected to the left steering knuckle, the right steering arm is connected to the right steering knuckle.

5. The transaxle of a rail vehicle according to claim 4, wherein the axle housing assembly is formed by welding a right half-axle fork, an axle housing, and a left half-axle fork, wherein the left half-axle fork has an upper left limb and a lower left limb that are disposed at an interval in the vertical direction, the left pin shaft comprises an upper left pin shaft and a lower left pin shaft, the left steering knuckle cooperates with the upper left pin shaft inside the upper left limb and cooperates with the lower left pin shaft inside the lower left limb to be pivotally connected to the left half-axle fork, the right half-axle fork has an upper right limb and a lower right limb that are disposed at an interval in the vertical direction, the right pin shaft comprises an upper right pin shaft and a lower right pin shaft, and the right steering knuckle cooperates with the upper right pin shaft inside the upper right limb and cooperates with the lower right pin shaft inside the lower right limb to be pivotally connected to the right half-axle fork.

6. The transaxle of a rail vehicle according to claim 5, wherein a push cylindrical roller bearing is disposed between the left steering knuckle and at least one of the upper left limb and the lower left limb, and a push cylindrical roller bearing is disposed between the right steering knuckle and at least one of the upper right limb and the lower right limb.

7. The transaxle of a rail vehicle according to claim 4, wherein the transaxle of a rail vehicle further comprises two brakes, the two running wheels are respectively mounted on the left steering knuckle and the right steering knuckle by a wheel hub assembly, and the two brakes are respectively locked on the two wheel hub assemblies by a guiding bolt.

8. The transaxle of a rail vehicle according to claim 7, further comprising a dust guard that is sleeved over the guiding bolt and used for preventing dust from touching the surface of the guiding bolt.

9. The transaxle of a rail vehicle according to claim 7, wherein a wheel speed sensor is disposed on at least one of the left steering knuckle and the right steering knuckle, an induction ring gear that rotates along with the running wheel is disposed on the brake, and the wheel speed sensor detects the rotation of the induction ring gear to detect the rotational speed of the running wheel.

10. The transaxle of a rail vehicle according to claim 1, further comprising a rear cover assembly, wherein the rear cover assembly is mounted on the axle body, an oil addition plug used for adding gear lubricating oil to the axle housing is disposed on the rear cover assembly, and an oil discharge plug used for discharging the gear lubricating oil is disposed on the bottom wall of the axle body.

11. The transaxle of a rail vehicle according to claim 1, further comprising a transmission shaft assembly, wherein a first end of the transmission shaft assembly is transmission-connected to the power assembly by a spline, a second end of the transmission shaft assembly is transmission-connected to the running wheel, and the transmission shaft assembly is supported on the axle housing assembly and a steering knuckle assembly by a needle roller bearing.

12. The transaxle of a rail vehicle according to claim 1, wherein the power assembly comprises a motor and a main reduction drive, the motor is electrically connected to a battery of the rail vehicle, and an output shaft of the motor is transmission-connected to the transmission shaft assembly by the main reduction drive.

13. The transaxle of a rail vehicle according to claim 1, wherein two front horizontal wheels are provided, two rear horizontal wheels are provided, the upper surface of the rail beam is provided with a groove, the two front horizontal wheels respectively abut two sidewalls of the groove, and the two rear horizontal wheels respectively abut two sidewalls of the groove.

14. The transaxle of a rail vehicle according to claim 1, further comprising a shock absorber assembly, wherein the shock absorber assembly is respectively connected to the axle body and the vehicle frame of the rail vehicle.

15. The transaxle of a rail vehicle according to claim 1, further comprising a secondary spring assembly, wherein the structure of the secondary spring assembly comprises:
  a spring upper base plate, mounted on the vehicle frame of the rail vehicle, wherein the lower surface of the spring upper base plate is provided with an upper guiding post; and
  a spring lower base plate, connected to the axle body, wherein the upper surface of the spring lower base plate is provided with a lower guiding post;
  an auxiliary spring, sleeved over the upper guiding post and the lower guiding post; and
  a main spring, sleeved over the auxiliary spring.

16. The transaxle of a rail vehicle according to claim 1, further comprising:
  a V-shaped push rod component, comprising:
    two V push rod cylinders, wherein first ends of the two V push rod cylinders are connected to a V push mounting base, second ends of the two V push rod cylinders are far away from each other;
    two V push rod heads, being respectively in threaded cooperation inside the two V push rod cylinders; and
    two V push rod head mounting bases, wherein the two V push rod heads are respectively connected to the vehicle frame of the rail vehicle by the two V push rod head mounting bases.

17. The transaxle of a rail vehicle according to claim 1, further comprising two straight push rod components, comprising:
  two straight push rod heads, wherein one of the two straight push rod heads is mounted on the axle body;
  a straight push rod head mounting base, wherein the other of the two straight push rod heads is mounted on the vehicle frame of the rail vehicle by the straight push rod head mounting base;
  a straight push rod cylinder, wherein the two straight push rod heads are respectively in cooperation inside two ends of the straight push rod cylinder; and
  two locking bushings, configured for locking connections between the straight push rod cylinder and the straight push rod heads, sleeved over the straight push rod cylinder and respectively disposed at two ends of the straight push rod cylinder.

18. The transaxle of a rail vehicle according to claim 1, further comprising a stabilizing rod assembly, comprising:
  two stabilizing rod sleeves;
  two stabilizing rod heads, mounted on the axle body;
  two stabilizing rod connecting rods, wherein two ends of each stabilizing rod connecting rod are respectively in threaded cooperation inside the stabilizing rod head and the stabilizing rod sleeve;
  two swing rods, wherein a first end of each swing rod is pivotally connected to the stabilizing rod sleeve, a second end of the swing rod is provided with a through hole;
  a stabilizing rod body, wherein two ends of the stabilizing rod body respectively pass through the two through holes; and
  two stabilizing rod mounting support bases, wherein two ends of the stabilizing rod body are respectively mounted on the vehicle frame of the rail vehicle by the two stabilizing rod mounting support bases.

19. The transaxle of a rail vehicle according to claim 1, further comprising a support post assembly, comprising:
  two auxiliary support posts, wherein a first end of each auxiliary support post is mounted on the axle body;
  a main support post, wherein a first end of the main support post is mounted on the axle body, a second end of the main support post is axially rotatably mounted on the guiding frame; and
  two guiding frame support wheels, wherein the guiding frame is provided with a chute, a second end of each auxiliary support post passes through the chute to be connected to the guiding frame support wheel, the guiding frame is supported on the guiding frame support wheel.

20. A rail vehicle, comprising the transaxle of a rail vehicle according to claim 1.

* * * * *